(12) United States Patent
Ohzeki et al.

(10) Patent No.: US 6,649,336 B2
(45) Date of Patent: Nov. 18, 2003

(54) SILVER HALIDE PHOTOGRAPHIC LIGHT-SENSITIVE MATERIAL

(75) Inventors: Katsuhisa Ohzeki, Kanagawa (JP); Tetsuo Nakamura, Kanagawa (JP)

(73) Assignee: Fuji Photo Film Co., LTD, Kanagawa (JP)

( * ) Notice: Subject to any disclaimer, the term of this patent is extended or adjusted under 35 U.S.C. 154(b) by 0 days.

(21) Appl. No.: 09/960,981

(22) Filed: Sep. 25, 2001

(65) Prior Publication Data
US 2002/0072019 A1 Jun. 13, 2002

(30) Foreign Application Priority Data
Sep. 26, 2000 (JP) ........................................ 2000-292446

(51) Int. Cl.$^7$ .......................... G03C 1/005; G03C 1/494
(52) U.S. Cl. ..................... 430/584; 430/567; 430/599; 430/604; 430/605; 430/963; 430/945; 430/570; 430/581; 430/583; 430/585; 430/586; 430/587; 430/572; 430/574; 430/576; 430/577
(58) Field of Search .................. 430/567, 599, 430/604, 605, 963, 945, 570, 581, 583, 584, 585, 586, 587, 572, 574, 576, 577

(56) References Cited

U.S. PATENT DOCUMENTS

| 5,057,406 A | * | 10/1991 | Usagawa et al. | ........... | 430/581 |
|---|---|---|---|---|---|
| 5,340,694 A | * | 8/1994 | Hioki et al. | ................. | 430/588 |
| 5,547,828 A | * | 8/1996 | Hioki et al. | ................. | 430/606 |
| 5,747,236 A | * | 5/1998 | Farid et al. | ................. | 430/583 |
| 5,928,852 A | * | 7/1999 | Ohzeki | ....................... | 430/567 |
| 5,994,051 A | * | 11/1999 | Gould et al. | ................. | 430/588 |
| 6,090,535 A | * | 7/2000 | Morimura | ................... | 430/567 |

FOREIGN PATENT DOCUMENTS

| JP | 2791499 | 6/1998 |
|---|---|---|
| JP | 2000-63690 | 2/2000 |

OTHER PUBLICATIONS

Abstract–European Patent, 08272029, Oct. 18, 1996.

* cited by examiner

Primary Examiner—Geraldine Letscher
(74) Attorney, Agent, or Firm—Sughrue Mion, PLLC

(57) ABSTRACT

A silver halide photographic light-sensitive material is disclosed, including at least one silver halide emulsion layer, wherein the silver halide grain contained in the emulsion layer is silver chloroiodide or silver chloroiodobromide having a silver chloride content of 90 mol % or more and a silver iodide content of 0.01 to 1.0 mol %, at least one hexacyano complex is doped in an amount of at least $1 \times 10^{-7}$ mol % based on the total silver amount, and the emulsion layer contains a methine dye represented by the formula (I) as defined.

9 Claims, No Drawings

SILVER HALIDE PHOTOGRAPHIC LIGHT-SENSITIVE MATERIAL

FIELD OF THE INVENTION

The present invention relates to a silver halide photographic light-sensitive material for photographing, more specifically, the present invention relates to improvements in the stability of a light-sensitive material comprising silver chloroiodide or silver chloroiodobromide grains having a high silver chloride content.

BACKGROUND OF THE INVENTION

For the purpose of attaining simple and rapid development processing, various techniques using so-called high silver chloride grains having a high silver chloride content (a grain having a silver chloride content of 90% or more and hereinafter referred to as a "high silver chloride grain") have been proposed. The use of high silver chloride grain is advantageous in that the development speed increases and at the same time, reusability of the processing solution increases. From these reasons, the light-sensitive material for printing, such as color printing paper, is predominated by the type using high silver chloride grains.

On the other hand, the emulsion for use in the printing material is demanded to have high sensitivity and low fogging. JP-A-8-234345 (the term "JP-A" as used herein means an "unexamined published Japanese patent application") discloses a technique of incorporating a slight amount of silver iodide into a high silver chloride grain, which is effective for obtaining high sensitivity. Furthermore, U.S. Pat. No. 5,268,264 discloses a technique for obtaining high sensitivity by doping a hexacyano complex which is considered to provide a shallow electron trap. The elevation in sensitivity considered ascribable to the shallow electron trap is observed also when a hexacyano complex is doped into a silver chloride emulsion. However, accompanying the introduction of silver iodide and the doping of a hexacyano complex, fogging increases and a technique for reducing the fogging is demanded. Furthermore, severe pressure fogging is liable to occur by the introduction of silver iodide and the doping of a hexacyano complex. The term "pressure fogging" as used herein means a phenomenon such that a development center is formed due to pressure or rubbing applied to the surface of a light-sensitive material by a transportation roller or the like during the processing such as exposure or development, and a color irrelevant to the image is formed.

In the present application, a time period (dry to dry) from the initiation of processing (contact with a developer) to the completion of drying is defined as the processing time. In the processing of a color print material, a color processing time of 180 seconds is predominating at present, however, more reduction in the processing time is demanded. Accompanying the reduction in the processing time, the transportation speed of equipment increases and thereby the pressure to a light-sensitive material also increases. Furthermore, in order to cope with the rapid processing, the developer must have a high temperature and a high concentration, namely, a highly active developer is necessary, and this causes ready occurrence of pressure fogging. Accordingly, a technique of reducing the pressure fogging is demanded.

For reducing the pressure fogging, a method of introducing a defect into the inside is known, however, this technique requires to use iodide in a high concentration and raises a problem of development inhibition. Furthermore, the internal defect is difficult to control and moreover, reduces the surface sensitivity or sometimes causes pressure desensitization (a phenomenon such that the sensitivity decreases due to a pressure). On the other hand, a low concentration iodide is often used on the grain surface so as to strengthen the adsorption of sensitizing dyes, however, the low concentration iodide is known to increase the pressure fogging and improvements on this point is also demanded.

JP-A-7-140581 discloses a method of reducing the pressure fogging using a specific dye. The sensitizing dye for use in the present invention is disclosed in Japanese Patent (registered) No. 2791499 and JP-A-2000-63690, where, however, the introduction of iodide is not referred to as an essential matter and particularly, in the latter, silver chloride is disclosed as a preferred embodiment. As such, these publications by no means suggest the present invention.

SUMMARY OF THE INVENTION

The object of the present invention is to provide a high silver chloride photographic light-sensitive material having high sensitivity and reduced in fogging.

The object of the present invention has been attained by the following means.

1. A silver halide photographic light-sensitive material comprising at least one silver halide emulsion layer, wherein the silver halide grain contained in the emulsion layer is silver chloroiodide or silver chloroiodobromide having a silver chloride content of 90 mol % or more and a silver iodide content of 0.01 to 1.0 mol %, at least one hexacyano complex is doped in an amount of at least $1\times10^{-7}$ mol % based on the total silver amount, and the emulsion layer contains a methine dye represented by the following formula (I):

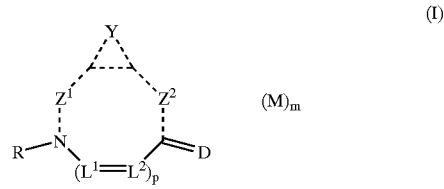

wherein Y represents an atomic group necessary for forming a heterocyclic ring or an atomic group necessary for forming a benzene ring condensed with a heterocyclic ring, which may further be condensed with another carbon ring or heterocyclic ring or may have a substituent, $Z^1$ and $Z^2$ each represents a single bond or an atomic group necessary for forming a nitrogen-containing heterocyclic ring which may further be condensed with another carbon ring or heterocyclic ring or may have a substituent, R represents an alkyl group, an aryl group or a heterocyclic group, D represents a group necessary for forming a methine dye, $L^1$ and $L^2$ each represents a methine group, p represents 0 or 1, M represents a counter ion, and m represents a number of 0 or more necessary for neutralizing the electric charge within the molecule.

2. The silver halide photographic light-sensitive material as described in 1, wherein in formula (I), Y represents an atomic group necessary for forming a pyrrole ring, a furan ring, a thiophene ring or a benzene ring condensed with a pyrrole ring, a furan ring or a thiophene ring, and the ring formed by Y may be condensed with another carbon ring or heterocyclic ring or may have a substituent.

3. The silver halide photographic light-sensitive material as described in 1, wherein the formula (I) is selected from the following formula (II):

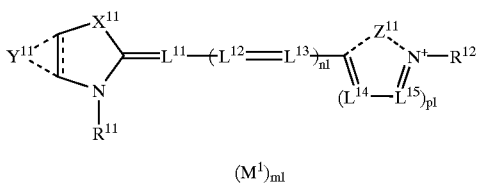

(II)

wherein $Y^{11}$ represents an atomic group necessary for forming a pyrrole ring, a furan ring or a thiophene ring, or an atomic group necessary for forming an indole ring, a benzofuran ring or a benzothiophene ring, which may further be condensed with another carbon ring or heterocyclic ring or may have a substituent, $X^{11}$ represents an oxygen atom, a sulfur atom, a selenium atom or $NR^{13}$, $R^{11}$, $R^{12}$ and $R^{13}$ each represents an alkyl group, an aryl group or a heterocyclic group, $Z^{11}$ represents an atomic group necessary for forming a nitrogen-containing heterocyclic ring which may further be condensed with another carbon ring or heterocyclic ring or may have a substituent, $L^{11}$, $L^{12}$, $L^{13}$, $L^{14}$ and $L^{15}$ each represents a methine group, p1 represents 0 or 1, n1 represents 0, 1, 2, 3 or 4, $M^1$ represents a counter ion and m1 represents a number of 0 or more necessary for neutralizing the electric charge within the molecule.

4. The silver halide photographic light-sensitive material as described in 1, wherein the formula (I) is selected from the following formula (III):

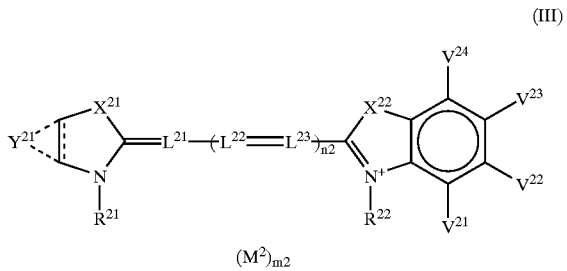

(III)

wherein $Y^{21}$ represents an atomic group necessary for forming a pyrrole ring, a furan ring or a thiophene ring, which may further be condensed with another carbon ring or heterocyclic ring or may have a substituent, $X^{21}$ and $X^{22}$ each represents an oxygen atom, a sulfur atom, a selenium atom or $NR^{23}$, $R^{21}$, $R^{22}$ and $R^{23}$ each represents an alkyl group, an aryl group or a heterocyclic group, $V^{21}$, $V^{22}$, $V^{23}$ and $V^{24}$ each represents a hydrogen atom or a substituent, provided that two adjacent substituents are not combined with each other to form a saturated or unsaturated condensed ring, $L^{21}$, $L^{22}$ and $L^{23}$ each represents a methine group, n2 represents 0, 1, 2, 3 or 4, $M^2$ represents a counter ion and m2 represents a number of 0 or more necessary for neutralizing the electric charge within the molecule.

5. The silver halide photographic light-sensitive material as described in any one of 1 to 4, wherein the silver halide grain is doped with at least one Ir complex.

6. The silver halide light-sensitive material as described in any one of 1 to 5, wherein silver halide grains occupying 50% or more of the entire grain volume have a high silver bromide localized phase having a silver bromide content 10 mol % or more higher than that of the adjacent phase and the high silver bromide localized phase contains at least one Ir complex.

7. A method for forming an image, comprising imagewise exposing and developing a silver halide photographic light-sensitive material comprising a support having thereon at least one silver halide emulsion layer, wherein the silver halide light-sensitive material is the light-sensitive material described in 1 to 6 and the total processing time of the light-sensitive material is 75 seconds or less.

8. The method for forming an image as described in 7, wherein digital scanning exposure is performed.

DETAILED DESCRIPTION OF THE INVENTION

The present invention is described in detail below.

In the present invention, specific spectral sensitizing dyes are used. The dyes are described below.

In the present invention, when a specific moiety is called "a group", this means that the moiety itself may not be substituted or may be substituted by one or more (to the possible maximum number of) substituents. For example, "an alkyl group" means a substituted or unsubstituted alkyl group. The substituent which can be used in the compounds for use in the present invention includes any substituent, irrespective of the presence or absence of substitution.

Assuming that the substituent is V, the substituent represented by V is not particularly limited, however, examples thereof include a halogen atom, an alkyl group [(including a cycloalkyl group and a bicycloalkyl group), also including an alkenyl group (including a cycloalkenyl group, a bicycloalkenyl group and a tricycloalkenyl group) and an alkynyl group], an aryl group, a heterocyclic group, a cyano group, a hydroxy group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxy-carbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an alkoxycarbonyl group, an aryloxycarbonyl group, a carbamoyl group, an arylazo group, a heterocyclic azo group, an imido group, a phosphino group, a phosphinyl group, a phosphinyloxy group, a phosphinylamino group, a phospho group, a silyl group, a hydrazino group, a ureido group and other known substituents.

More specifically, examples of V include a halogen atom (e.g., fluorine, chlorine, bromine, iodine), an alkyl group [a linear, branched or cyclic, substituted or unsubstituted alkyl group; the alkyl group includes an alkyl group (preferably an alkyl group having from 1 to 30 carbon atoms, e.g., methyl, ethyl, n-propyl, isopropyl, tert-butyl, n-octyl, eicosyl, 2-chloroethyl, 2-cyanoethyl, 2-ethylhexyl), a cycloalkyl group (preferably a substituted or unsubstituted cycloalkyl group having from 3 to 30 carbon atoms, e.g., cyclohexyl, cyclopentyl, 4-n-dodecylcyclohexyl), a bicycloalkyl group (preferably a substituted or unsubstituted bicycloalkyl group having from 5 to 30 carbon atoms, e.g., bicyclo[1.2.2] heptan-2-yl, bicyclo[2.2.2]octan-3-yl), and a tricyclo-alkyl group having many ring structures; the alkyl group in the substituents described below (for example, the alkyl group in an alkylthio group) includes an alkyl group having such a concept and further includes an alkenyl group, a cycloalkenyl group, a bicycloalkenyl group and an alkynyl group, which are described below], an alkenyl group [a linear, branched or cyclic, substituted or unsubstituted alkenyl group; the alkenyl group includes an alkenyl group (preferably a substituted or unsubstituted alkenyl group having from 2 to 30 carbon atoms, e.g., vinyl, allyl, prenyl, geranyl, oleyl), a cycloalkenyl group (preferably a substituted or unsubstituted cycloalkenyl group having from 3 to 30 carbon atoms, e.g., 2-cyclopenten-1-yl, 2-cyclohexen-1-yl) and a bicycloalkenyl group (a substituted or unsubstituted bicycloalkenyl group having, preferably a substituted or unsubstituted bicycloalkenyl group having from 5 to 30 carbon atoms, e.g., bicyclo[2.2.1]hept-2-en-1-yl, bicyclo[2.2.2]oct-2-en-4-yl)], an alkynyl group (preferably a substituted or unsubstituted alkynyl group having from 2 to 30 carbon atoms, e.g., ethynyl, propargyl, trimethylsilylethynyl), an aryl group (preferably a substituted or unsubstituted aryl group having from 6 to 30 carbon atoms, e.g., phenyl, p-tolyl, naphthyl, m-chlorophenyl, o-hexadecanoylaminophenyl), a heterocyclic group (preferably a monovalent group resulting from eliminating one hydrogen atom from a 5- or 6-membered, substituted or unsubstituted, aromatic or non-aromatic heterocyclic compound, more preferably a 5- or 6-membered aromatic heterocyclic group having from 3 to 30 carbon atoms, e.g., 2-furyl, 2-thienyl, 2-pyrimidinyl, 2-benzothiazolyl; a cationic heterocyclic group such as 1-methyl-2-pyridinio and 1-methyl-2-quinolinio may also be used), a cyano group, a hydroxyl group, a nitro group, a carboxyl group, an alkoxy group (preferably a substituted or unsubstituted alkoxy group having from 1 to 30 carbon atoms, e.g., methoxy, ethoxy, isopropoxy, tert-butoxy, n-octyloxy, 2-methoxyethoxy), an aryloxy group (preferably a substituted or unsubstituted aryloxy group having from 6 to 30 carbon atoms, e.g., phenoxy, 2-methylphenoxy, 4-tert-butylphenoxy, 3-nitrophenoxy, 2-tetradecanoylaminophenoxy), a silyloxy group (preferably a silyloxy group having from 3 to 20 carbon atoms, eg., trimethylsilyloxy, tert-butyldimethylsilyloxy), a heterocyclic oxy group (preferably a substituted or unsubstituted heterocyclic oxy group having from 2 to 30 carbon atoms, e.g., 1-phenyltetrazol-5-oxy, 2-tetrahydropyranyloxy), an acyloxy group (preferably a formyloxy group, a substituted or unsubstituted alkylcarbonyloxy group having from 2 to 30 carbon atoms and a substituted or unsubstituted arylcarbonyloxy group having from 6 to 30 carbon atoms, e.g., formyloxy, acetyloxy, pivaloyloxy, stearoyloxy, benzoyloxy, p-methoxyphenylcarbonyloxy), a carbamoyloxy group (preferably a substituted or unsubstituted carbamoyloxy group having from 1 to 30 carbon atoms, e.g., N,N-dimethylcarbamoyloxy, N,N-diethylcarbamoyloxy, morpholinocarbonyloxy, N,N-di-n-octylaminocarbonyloxy, N-n-octylcarbamoyloxy), an alkoxycarbonyloxy group (preferably a substituted or unsubstituted alkoxycarbonyloxy group having from 2 to 30 carbon atoms, e.g., methoxycarbonyloxy, ethoxycarbonyloxy, tert-butoxycarbonyloxy, n-octylcarbonyloxy), an aryloxycarbonyloxy group (preferably a substituted or unsubstituted aryloxycarbonyloxy group having from 7 to 30 carbon atoms, e.g., phenoxycarbonyloxy, p-methoxyphenoxycarbonyloxy, p-n-hexadecyloxyphenoxycarbonyloxy), an amino group (preferably an amino group, a substituted or unsubstituted alkylamino group having from 1 to 30 carbon atoms and a substituted or unsubstituted anilino group having from 6 to 30 carbon atoms, e.g., amino, methylamino, dimethylamino, anilino, N-methylanilino, diphenylamino), an ammonio group (preferably an ammonio group, an ammonio group substituted by a substituted or unsubstituted alkyl, aryl or heterocyclic group having from 1 to 30 carbon atoms, e.g., trimethylammonio, triethylammonio, diphenylmethylammonio), an acylamino group (preferably a formylamino group, a substituted or unsubstituted alkylcarbonylamino group having from 1 to 30 carbon atoms and a substituted or unsubstituted arylcarbonylamino group having from 6 to 30 carbon atoms, e.g., formylamino, acetylamino, pivaloylamino, lauroylamino, benzoylamino, 3,4,5-tri-n-octyloxyphenylcarbonylamino), an aminocarbonylamino group (preferably a substituted or unsubstituted aminocarbonylamino group having from 1 to 30 carbon atoms, e.g., carbamoylamino, N,N-dimethylaminocarbonylamino, N,N-diethylaminocarbonylamino, morpholinocarbonylamino), an alkoxycarbonylamino group (preferably a substituted or unsubstituted alkoxycarbonylamino group having from 2 to 30 carbon atoms, e.g., methoxycarbonylamino, ethoxycarbonylamino, tert-butoxycarbonylamino, n-octadecyloxycarbonylamino, N-methylmethoxycarbonylamino), an aryloxycarbonylamino group (preferably a substituted or unsubstituted aryloxycarbonylamino group having from 7 to 30 carbon atoms, e.g., phenoxycarbonylamino, p-chlorophenoxycarbonylamino, m-(n-octyloxyphenoxycarbonylamino)), a sulfamoylamino group (preferably a substituted or unsubstituted sulfamoylamino group having from 0 to 30 carbon atoms, e.g., sulfamoylamino, N,N-dimethylaminosulfonylamino, N-n-octylaminosulfonylamino), an alkyl- or arylsulfonylamino group (preferably a substituted or unsubstituted alkylsulfonylamino group having from 1 to 30 carbon atoms and a substituted or unsubstituted arylsulfonylamino group having from 6 to 30 carbon atoms, e.g., methylsulfonylamino, butylsulfonylamino, phenylsulfonylamino, 2,3,5-trichlorophenylsulfonylamino, p-methylphenylsulfonylamino), a mercapto group, an alkylthio group (preferably a substituted or unsubstituted alkylthio group having from 1 to 30 carbon atoms, e.g., methylthio, ethylthio, n-hexadecylthio), an arylthio group (preferably a substituted or unsubstituted arylthio group having from 6 to 30 carbon atoms, e.g., phenylthio, p-chlorophenylthio, m-methoxyphenylthio), a heterocyclic thio group (preferably a substituted or unsubstituted heterocyclic thio group having from 2 to 30 carbon atoms, e.g., 2-benzothiazolylthio, 1-phenyltetrazol-5-ylthio), a sulfamoyl group (preferably a substituted or unsubstituted sulfamoyl group having from 0 to 30 carbon atoms, e.g., N-ethylsulfamoyl, N-(3-dodecyloxypropyl)sulfamoyl, N,N-dimethylsulfamoyl, N-acetylsulfamoyl, N-benzoylsulfamoyl, N-(N'-phenylcarbamoyl)sulfamoyl), a sulfo group, an alkyl- or aryl-sulfinyl group (preferably a substituted or unsubstituted alkylsulfinyl group having from 1 to 30 carbon atoms and a substituted or unsubstituted arylsulfinyl group having from 6 to 30 carbon atoms, e.g., methylsulfinyl, ethylsulfinyl, phenylsulfinyl, p-methylphenylsulfinyl), an alkyl- or aryl-sulfonyl group (preferably a substituted or unsubstituted alkylsulfonyl group having from 1 to 30 carbon atoms and a substituted or unsubstituted arylsulfonyl group having from 6 to 30 carbon atoms, e.g., methylsulfonyl, ethylsulfonyl, phenylsulfonyl, p-methylphenylsulfonyl), an acyl group (preferably a formyl group, a substituted or unsubstituted alkylcarbonyl group having from 2 to 30 carbon atoms, a substituted or unsubstituted arylcarbonyl group having from 7 to 30 carbon atoms and a substituted or unsubstituted heterocyclic carbonyl group having from 4 to 30 carbon atoms in which the carbonyl group is bonded through a carbon atoms, e.g., acetyl, pivaloyl, 2- chloroacetyl, stearoyl, benzoyl, p-n-octyloxyphenylcarbonyl, 2-pyridylcarbonyl, 2-furylcarbonyl), an aryloxycarbonyl group (preferably a substituted or unsubstituted aryloxycarbonyl group having from 7 to 30 carbon atoms, e.g., phenoxycarbonyl, o-chlorophenoxycarbonyl, m-nitrophenoxycarbonyl, p-t-butylphenoxycarbonyl), an alkoxycarbonyl group (preferably a substituted or unsubstituted alkoxycarbonyl group having from 2 to 30 carbon atoms, e.g., methoxycarbonyl, ethoxycarbonyl, tert-butoxycarbonyl, n-octadecyloxycarbonyl), a carbamoyl group (preferably a substituted or unsubstituted carbamoyl group having from 1 to 30 carbon atoms, e.g., carbamoyl, N-methylcarbamoyl, N,N-dimethylcarbamoyl, N,N-di-n-octylcarbamoyl, N-(methylsulfonyl)carbamoyl), an aryl- or heterocyclic-azo group (preferably a substituted or unsubstituted arylazo group having from 6 to 30 carbon atoms and a substituted or unsubstituted heterocyclic azo group having from 3 to 30 carbon atoms, e.g., phenylazo, p-chlorophenylazo, 5-ethylthio-1,3,4-thiadiazol-2-ylazo), an imide group (preferably N-succinimide and N-phthalimide), a phosphino group (preferably a substituted or unsubstituted phosphino group having from 2 to 30 carbon atoms, e.g., dimethylphosphino, diphenylphosphino, methylphenoxyphosphino), a phosphinyl group (preferably a substituted or unsubstituted phosphinyl group having from 2 to 30 carbon atoms, e.g., phosphinyl, dioctyloxyphosphinyl, diethoxyphosphinyl), a phosphinyloxy group (preferably a substituted or unsubstituted phosphinyloxy group having from 2 to 30 carbon atoms, e.g., diphenoxyphosphinyloxy, dioctyloxyphosphinyloxy), a phosphinylamino group (preferably a substituted or unsubstituted phosphinylamino group having from 2 to 30 carbon atoms, e.g., dimethoxyphosphinylamino, dimethylaminophosphinylamino), a phospho group, a silyl group (preferably a substituted or unsubstituted silyl group having from 3 to 30 carbon atoms, e.g., trimethylsilyl, tert-butyldimethylsilyl, phenyldimethylsilyl), a hydrazino group (preferably a substituted or unsubstituted hydrazino group having from 0 to 30 carbon atoms, e.g., trimethylhydrazino) and a ureido group (preferably a substituted or unsubstituted ureido group having from 0 to 30 carbon atoms, e.g., N,N-dimethylureido).

Also, two V may combine to have a structure condensed with a ring (an aromatic or non-aromatic, hydrocarbon or heterocyclic ring; these rings may further be combined to form a polycyclic condensed ring; examples thereof include a benzene ring, a naphthalene ring, an anthracene ring, a quinoline ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolizine ring, a quinoline ring, a phthalazine ring, a naphthylizine ring, a quinoxaline ring, a quinoxazoline ring, a quinoline ring, a carbazole ring, a phenanthridine ring, an acridine ring, a phenanthroline ring, a thianthrene ring, a chromene ring, a xanthene ring, a phenoxathiine ring, a phenothiazine ring and a phenazine ring).

Among these substituents V, those having a hydrogen atom may further be substituted by the above-described substituent after eliminating the hydrogen atom. Examples of such a composite substituent include an acylsulfamoyl group, an alkylsulfonylcarbamoyl group and an arylsulfonylcarbamoyl group. Specific examples thereof include methylsulfonylcarbamoyl, p-methylphenylsulfonylcarbamoyl, acetylsulfamoyl and benzoylsulfamoyl.

The methine dye represented by formula (I) for use in the present invention is described in detail below.

When Y is an atomic group necessary for forming a heterocyclic ring, examples of the 5-membered unsaturated heterocyclic ring formed by Y include a pyrrole ring, a pyrazole ring, an imidazole ring, a triazole ring, a furan ring, an oxazole ring, an isooxazole ring, a thiophene ring, a thiazole ring, an isothiazole ring, a thiadiazole ring, a selenophene ring, a selenazole ring, an isoselenazole ring, a tellurophene ring, a tellurazole ring, an isotellurazole ring. Examples of the 6-membered unsaturated heterocyclic ring include a pyridine ring, a pyridazine ring, a pyrimidine ring, a pyrazine ring, a pyrane ring and a thiopyrane ring. The ring formed by Y may further be condensed with another 5- or 6-membered carbon ring or heterocyclic ring to form, for example, an indole ring, a benzofurane ring, a benzothiophene ring or a thienothiophene ring. Also, the ring formed by Y may be an unsaturated heterocyclic ring resulting from the hydrogenation of a part of double bonds in the above-described heterocyclic rings, such as pyrroline ring, pyrazoline ring, imidazoline ring, dihydrofuran ring, oxazoline ring, dihydrothiophene ring and thiazoline ring, or a saturated heterocyclic ring resulting from the hydrogenation of all double bonds, such as pyrrolidine ring, pyrazolidine ring, imidazolidine ring, tetrahydrofurane ring, oxazolidine ring, tetrahydrothiophene ring and thiazolidine ring.

When Y is an atomic group necessary for forming a benzene ring condensed with a heterocyclic ring, examples of the ring formed by Y include an indole ring, a benzofuran ring and a benzothiophene ring.

The ring formed by Y is preferably a pyrrole ring, a furan ring, a thiophene ring, an indole ring, a benzofuran ring or a benzothiophene ring, more preferably a pyrrole ring, a thiophene ring or a furan ring.

The nitrogen-containing heterocyclic ring formed by $Z^1$ and $Z^2$ is preferably a 5- or 6-membered nitrogen-containing heterocyclic ring and examples thereof include an oxazole ring, a thiazole ring, a selenazole ring, an imidazole ring, a 2-pyridine ring, a 4-pyridine ring and a 3,3-dimethyl-3H-pyrrole ring. Other than the ring formed by Y, a carbon ring such as benzene ring, cyclohexene ring and naphthalene ring, or a heterocyclic ring such as furan ring and thiophene ring, may be condensed thereto.

The nitrogen-containing heterocyclic ring formed by $Z^1$ and $Z^2$ is more preferably an oxazole ring, a thiazole ring, an imidazole ring or a 2-pyridine ring, more preferably an oxazole ring or a thiazole ring.

The ring formed by Y and the nitrogen-containing heterocyclic ring formed by $Z^1$ and $Z^2$ each may have a substituent and examples thereof include those described above as the substituent represented by V.

Among the substituents V, preferred are the above-described alkyl group, aryl group, aromatic heterocyclic group, alkoxy group, alkylthio group, cyano group and halogen atom.

The alkyl group represented by R may be unsubstituted or unsubstituted and includes an unsubstituted alkyl group having from 1 to 18, preferably 1 to 7, more preferably from 1 to 4, carbon atoms (e.g., methyl, ethyl, propyl, isopropyl, butyl, isobutyl, hexyl, octyl, dodecyl, octadecyl), and a substituted alkyl group having from 1 to 8, preferably from 1 to 7, more preferably from 1 to 4, carbon atoms {examples of the substituent include the above-described substituents represented by V (such as an aryl group, an unsaturated hydrocarbon group, a carboxy group, a sulfo group, a sulfate group, a cyano group, a halogen atom (e.g., fluorine, chlorine, bromine, iodine), a hydroxy group, a mercapto group, an alkoxy group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyol group and an alkylsulfonylsulfamoyl group, which may further be substituted)}.

The aryl group represented by R may be unsubstituted or substituted and includes an unsubstituted aryl group having from 6 to 20, preferably 6 to 15, more preferably from 6 to 10, carbon atoms (e.g., phenyl, 1-naphthyl) and a substituted aryl group having from 6 to 26, preferably from 6 to 21, more preferably from 6 to 16, carbon atoms {examples of the substituent include the above-described substituents represented by V (such as an alkyl group, an aryl group, an unsaturated hydrocarbon group, a carboxy group, a sulfo group, a sulfate group, a cyano group, a halogen atom (e.g., fluorine, chlorine, bromine, iodine), a hydroxy group, a mercapto group, an alkoxy group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyl group and an alkylsulfonylsulfamoyl group, which may further be substituted)}.

The heterocyclic group represented by R may be unsubstituted or substituted and includes an unsubstituted heterocyclic group having from 1 to 20, preferably from 1 to 15, more preferably from 1 to 10, carbon atoms (e.g., pyrrole, furan, thiophene) and a substituted heterocyclic group having from 1 to 26, preferably from 1 to 21, more preferably from 1 to 16, carbon atoms {examples of the substituent include the above-described substituents represented by V}.

R is preferably a group substituted by an acid group or a group having a dissociative proton {specifically, a carboxyl group, a sulfo group, a phosphonic acid group, a boronic acid group, —CONHSO$_2$—, —SO$_2$NHSO$_2$—, —CONHCO—, —SO$_2$NHCO—}, more preferably an alkyl group substituted by the above-described acid group or group having a dissociative proton, still more preferably a substituted alkyl group containing any one of a carboxyl group, a sulfo group, an alkylsulfonylcarbamoyl group (e.g., methanesulfonylcarbonyl), an acylcarbamoyl group (e.g., acetylcarbamoyl), an acylsulfamoyl group (e.g., acetylsulfamoyl) and an alkylsulfonylsulfamoyl group (e.g., methanesulfonylsulfamoyl), and most preferably a carboxymethyl group, a 2-sulfoethyl group, a 3-sulfopropyl group, a 3-sulfobutyl group, a 4-sulfobutyl group or a methanesulfonylcarbamoylmethyl group.

The methine group represented by L$^1$ and L$^2$ may have a substituent and examples of the substituent include the above-described substituents represented by V.

p is preferably 0.

M is included in formula (I) so as to show the presence of cation or anion when required for neutralizing the ion charge of the dye. Whether a certain dye is cation or anion or bears a net ion charge depends on the substituent and the environment (e.g., pH) in a solution. Typical examples of the cation include inorganic cation such as hydrogen ion (H$^+$), alkali metal ion (e.g., sodium ion, potassium ion, lithium ion) and alkaline earth metal ion (e.g., calcium ion), and organic ion such as ammonium ion (e.g., ammonium ion, tetraalkylammonium ion, triethylammonium ion, pyridinium ion, ethylpyridinium ion, 1,8-diazabicyclo[5.4.0]-7-undecenium ion). The anion may be either inorganic anion or organic anion and examples thereof include halide anion (e.g., fluoride ion, chloride ion, bromide ion, iodide ion), substituted arylsulfonate ion (e.g., p-toluenesulfonate ion, p-chlorobenzenesulfonate ion), aryldisulfonate ion (e.g., 1,3-benzenesulfonate ion, 1,5-naphthalenedisulfonate ion, 2,6-naphthalenedisulfonate ion), alkylsulfate ion (e.g., methylsulfate ion), sulfate ion, thiocyanate ion, perchlorate ion, tetrafluoroborate ion, picrate ion, acetate ion and trifluoromethanesulfonate ion. Also, an ionic polymer or another dye having a charge opposite the dye may be used.

The cation is preferably sodium ion, potassium ion, triethylammonium ion, tetraethylammonium ion, pyridinium ion, ethylpyridinium ion or methylpyridinium ion, and the anion is preferably perchlorate ion, iodide ion, bromide ion or substituted arylsulfonate ion (e.g., p-toluenesulfonate ion).

m represents a number of 0 or more necessary for balancing the electric charge, preferably a number of 0 to 4. m is 0 when an inner salt is formed.

D is a group necessary for forming a methine dye and any methine dye may be formed by D, however, the methine dye is preferably a cyanine dye, a merocyanine dye, a rhodacyanine dye, a trinuclear merocyanine dye, a tetranuclear merocyanine dye, an allopolar dye, a hemicyanine dye or a styryl dye. These dyes are described in detail in F. M. Harmer, *Heterocyclic Compounds—Cyanine Dyes and Related Compounds*, John Wiley & Sons, New York, London (1964), D. M. Sturmer, *Heterocyclic Compounds—Special topics in heterocyclic chemistry*, Chap. 18, Section 14, pp. 482–515.

Examples of the formulae of preferred dyes include the formulae described U.S. Pat. No. 5,994,051, pages 32 to 36, and the formulae described in U.S. Pat. No. 5,747,236, pages 30 to 34. For cyanine dyes, merocyanine dyes and rhodacyanine dyes, formulae (XI), (XII) and (XIII) described in U.S. Pat. No. 5,340,694, columns 21 to 22, are preferred (on the condition that the numbers of n12, n15, n17 and n18 are not limited and each is an integer of 0 or more (preferably 4 or less)). Among these, cyanine, merocyanine and rhodacyanine dyes are preferred, and a cyanine dye is more preferred.

In the case where a cyanine dye is formed by D in formula (I), the cyanine dye can also be expressed by the following resonance formula (I'):

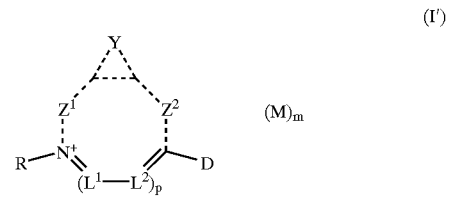

(I')

Preferred examples of the compound represented by formula (I) are more specifically set forth below. The compound represented by formula (I) is more preferably selected from the following formulae (a) to (l).

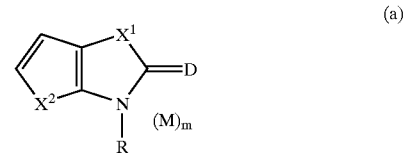

(a)

(b) 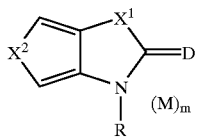

(c) 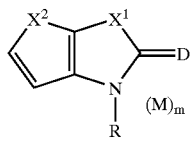

(d) 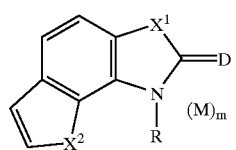

(e) 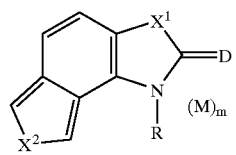

(f) 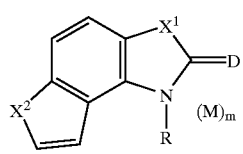

(g) 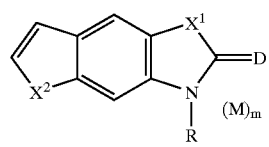

(h) 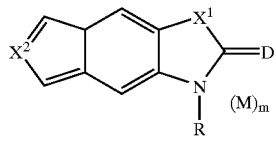

(i) 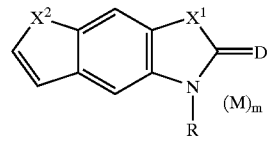

(j) 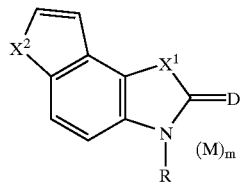

(k) 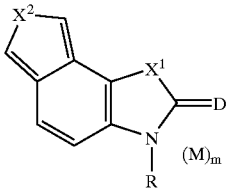

(l) 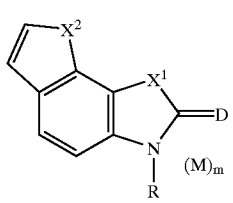

wherein D, R, M and m have the same meanings as those in formula (I), $X^1$ represents an oxygen atom, a sulfur atom, a selenium atom or $NR^1$ (wherein $R^1$ represents an alkyl group, an aryl group or a heterocyclic group), and $X^2$ represents an oxygen atom, a sulfur atom or $NR^2$ (wherein $R^2$ represents a hydrogen atom, an alkyl group, an aryl group or a heterocyclic group). The benzene ring or heterocyclic ring in the formulae may further be substituted by the above-described substituent represented by V or may be condensed with another carbon ring or heterocyclic ring.

Among these formulae, preferred are formulae (a) to (i), more preferred are formulae (a) to (f), still more preferred are formulae (a) to (c), and particularly preferred are formulae (a) and (c).

The methine dye represented by formula (I) is more preferably a methine dye selected from the following formulae (IA), (IB), (IC) and (ID):

(IA)

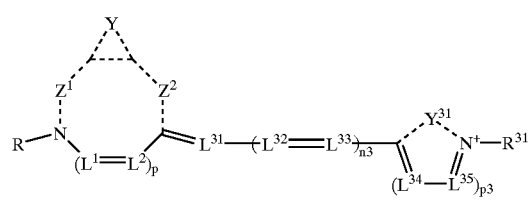

wherein Y, R, $Z^1$, $Z^2$, $L^1$, $L^2$ and p have the same meanings as in formula (I), $L^{31}$, $L^{32}$, $L^{33}$, $L^{34}$ and $L^{35}$ each represents a methine group, p3 represents 0 or 1, n3 represents 0, 1, 2, 3 or 4, $Y^{31}$ represents an atomic group necessary for forming a 5- or 6-membered nitrogen-containing heterocyclic ring, which may be condensed with another carbon ring or heterocyclic ring or may have a substituent, $M^3$ represents a counter ion, m3 represents a number of 0 to 4 necessary for neutralizing the electric charge of the molecular, and $R^{31}$ represents a substituted or unsubstituted alkyl, aryl or heterocyclic group;

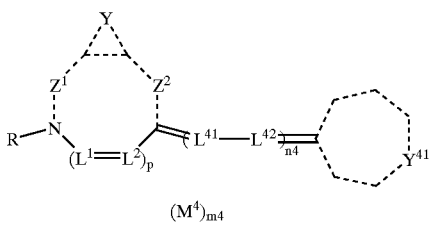

(IB)

wherein Y, R, $Z^1$, $Z^2$, $L^1$, $L^2$ and p have the same meanings as in formula (I), $L^{41}$ and $L^{42}$ each represents a methine group, n4 represents 0, 1, 2, 3 or 4, $Y^{41}$ represents an atomic group necessary for forming an acidic nucleus, which may be condensed with another carbon ring or heterocyclic ring or may have a substituent, $M^4$ represents a counter ion, and m4 represents a number of 0 or more necessary for neutralizing the electric charge of the molecule;

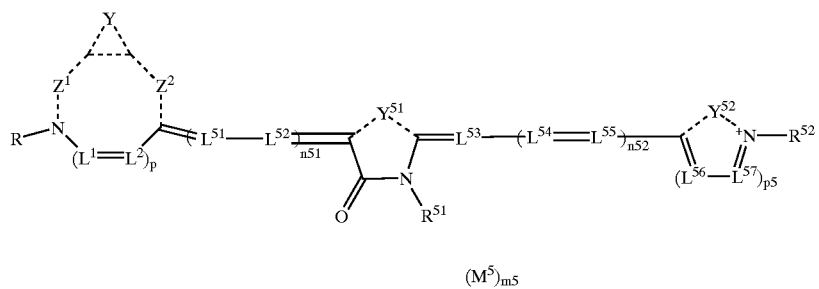

(IC)

wherein Y, R, $Z^1$, $Z^2$, $L^1$, $L^2$ and p have the same meanings as in formula (I), $L^{51}$, $L^{52}$, $L^{53}$, $L^{54}$, $L^{55}$, $L^{56}$ and $L^{57}$ each represents a methine group, p5 represents 0 or 1, n51 and n52 each represents 0, 1, 2, 3 or 4, $Y^{51}$ and $Y^{52}$ each represents an atomic group necessary for forming a 5- or 6-membered nitrogen-containing heterocyclic ring, which may have a substituent, provided that $Y^{52}$ may further be condensed with another carbon ring or heterocyclic ring, $M^5$ represents a counter ion, m5 represents a number of 0 to 4 necessary for neutralizing the electric charge of the molecule, and $R^{51}$ and $R^{52}$ each represents a substituted or unsubstituted alkyl, aryl or heterocyclic group;

condensed with another carbon ring or heterocyclic ring, $M^6$ represents a counter ion, m6 represents a number of 0 to 4 necessary for neutralizing the electric charge of the molecular, and $R^{61}$ and $R^{62}$ each represents a substituted or unsubstituted alkyl, aryl or heterocyclic group.

In formulae (IA), (IB), (IC) and (ID), the 5- or 6-membered nitrogen-containing heterocyclic ring represented by $Y^{31}$, $Y^{52}$ and $Y^{62}$ may further be condensed with another 5- or 6-membered carbon ring or heterocyclic ring. Examples of the carbon ring include a benzene ring and a naphthalene ring, and examples of the heterocyclic ring include a furan ring and a thiophene ring. The ring condensed is preferably a carbon ring, more preferably a benzene ring. Specifically, a 5- or 6-membered nitrogen-containing heterocyclic ring (type) described later as an example of $Z^{11}$ in formula (II) is preferred and specific examples thereof include those described as examples of $Z_{11}$, $Z_{12}$, $Z_{13}$, $Z_{14}$ and $Z_{16}$ in U.S. Pat. No. 5,340,694, columns 23 and 24.

$Y^{41}$ represents an atomic group necessary for forming an acyclic or cyclic acidic nucleus, and any acidic nucleus form of general merocyanine dyes may be formed. In a preferred form, a thiocarbonyl group or a carbonyl group is present next to the position where the methine chain of $Y^{41}$ is connected.

The "acidic nucleus" as used herein is defined, for example, in T. H. James (compiler), *The Theory of the Photographic Process*, 4th ed., page 198, MacMillan Publishing (1977). Specific examples thereof include those described in U.S. Pat. Nos. 3,567,719, 3,575,869, 3,804,634, 3,837,862, 4,002,480 and 4,925,777, and JP-A-3-167546.

(ID)

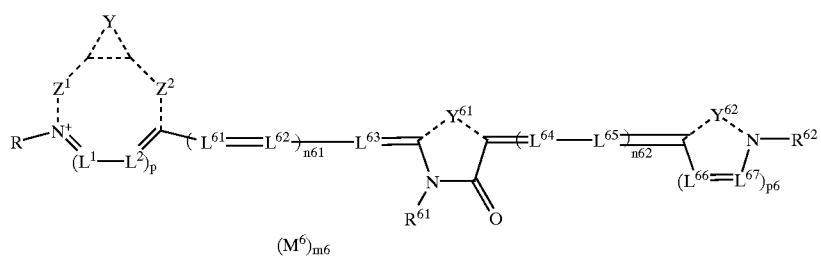

wherein Y, R, $Z^1$, $Z^2$, $L^1$, $L^2$ and p have the same meanings as in formula (I), $L^{61}$, $L^{62}$, $L^{63}$, $L^{64}$, $L^{65}$, $L^{66}$ and $L^{67}$ each represents a methine group, p6 represents 0 or 1, n61 and n62 each represents 0, 1, 2, 3 or 4, $Y^{61}$ and $Y^{62}$ each represents an atomic group necessary for forming a 5- or 6-membered nitrogen-containing heterocyclic ring which may have a substituent, provided that $Y^{62}$ may further be The acidic nucleus preferably forms a 5- or 6-membered nitrogen-containing heterocyclic ring comprising carbon, nitrogen and chalcogen (typically oxygen, sulfur, selenium and tellurium) atoms and examples thereof include the following nuclei:

nuclei of 2-pyrazolin-5-one, pyrazolidine-3,5-dione, imidazolin-5-one, hydantoin, 2- or 4-thiohydantoin, 2-iminooxazolidin-4-one, 2-oxazolin-5-one, 2-thiooxazoline-2,4-dione, isooxazolin-5-one, 2-thiazolin-4-one, thiazolidin-4-one, thiazolidine-2,4-dione, rhodanine, thiazolidine-2,4-dithione, isorhodanine, indane-1,3-dione, thiophen-3-one, thiophen-3-one-1,1-dioxide, indolin-2-one, indolin-3-one, 2-oxoindazolinium, 3-oxoindazolinium, 5,7-dioxo-6,7-dihydrothiazolo[3,2-a]pyrimidine, cyclohexane-1,3-dione, 3,4-dihydroisoquinolin-4-one, 1,3-dioxane-4,6-dione, barbituric acid, 2-thiobarbituric acid, chroman-2,4-dione, indazolin-2-one, pyrido[1,2-a]pyrimidine-1,3-dione, pyrazolo[1,5-b]quinazolone, pyrazolo[1,5-a]benzimidazole, pyrazolopyridone, 1,2,3,4-tetrahydroquinoline-2,4-dione, 3-oxo-2,3-dihydrobenzo[d]thiophene-1,1-dioxide and 3-dicyanomethylene-2,3-dihydrobenzo[d]thiophene-1,1-dioxide; and nuclei having an exomethylene structure where the carbonyl or thiocarbonyl group constituting the above-described nuclei is substituted at the active methylene position of an active methylene compound having a structure such as ketomethylene or cyanomethylene.

The acidic nucleus formed by $Y^{41}$ is preferably hydantoin, 2- or 4-thiohydantoin, 2-oxazolin-5-one, 2-thiooxazolin-2,4-dione, thiazolidine-2,4-dione, rhodanine, thiazolidine-2,4-dione, barbituric acid or 2-thiobarbituric acid, more preferably hydantoin, 2- or 4-thiohydantoin, 2-oxazolin-5-one, rhodanine, barbituric acid or 2-thiobarbituric acid, still more preferably 2- or 4-thiohydantoin, 2-oxazolin-5-one, rhodanine or barbituric acid.

The 5- or 6-membered nitrogen-containing heterocyclic ring formed by $Y^{51}$ and $Y^{61}$ is resultant from eliminating an oxo or thioxo group from the heterocyclic ring represented by $Y^{41}$, preferably resultant from eliminating an oxo or thioxo group from hydantoin, 2- or 4-thiohydantoin, 2-oxazolin-5-one, 2-thiooxazolin-2,4-dione, thiazolidine-2,4-dione, rhodanine, thiazolidine-2,4-dithione, barbituric acid or 2-thiobarbituric acid, more preferably resultant from eliminating an oxo or thioxo group from hydantoin, 2- or 4-thiohydantoin, 2-oxazolin-5-one, rhodanine, barbituric acid or 2-thiobarbituric acid, still more preferably resultant from eliminating an oxo or thioxo group from 2- or 4-thiohydantoin, 2-oxazolin-5-one or rhodanine.

$R^{31}$, $R^{51}$, $R^{52}$, $R^{61}$, $R^{62}$ and the substituent (if there, $R^{41}$ is allotted thereto) on a nitrogen atom of the acidic nucleus $Y^{41}$ each represents a substituted or unsubstituted alkyl, aryl or heterocyclic group and preferred examples thereof include those described above as examples for R in the methine dye of formula (I).

Among those, $R^{31}$, $R^{41}$, $R^{51}$, $R^{52}$, $R^{61}$ and $R^{62}$ each is preferably a substituted or unsubstituted alkyl group, more preferably an alkyl group substituted by an acid group or a group having a dissociative proton, still more preferably a substituted alkyl group containing any one of a carboxyl group, a sulfo group, —$CONHSO_2$—, —$SO_2NHSO_2$—, —CONHCO— and —$SO_2NHCO$—, particularly preferably a carboxymethyl group, a 2-sulfoethyl group, a 3-sulfopropyl group, a 3-sulfobutyl group, a 4-sulfobutyl group or a methanesulfonylcarbamoylmethyl group.

$L^{31}$, $L^{32}$, $L^{33}$, $L^{34}$, $L^{35}$, $L^{41}$, $L^{42}$, $L^{51}$, $L^{52}$, $L^{53}$, $L^{54}$, $L^{55}$, $L^{56}$, $L^{57}$, $L^{61}$, $L^{62}$, $L^{63}$, $L^{64}$, $L^{65}$, $L^{66}$ and $L^{67}$ each independently represents a methine group. These methine groups each may have a substituent and examples of the substituent include the above-described substituents represented by V.

This methine group may form a ring with another methine group or may form a ring together with $Y^{31}$, $Y^{41}$, $Y^{51}$, $Y^{52}$, $Y^{61}$ and $Y^{62}$.

$L^1$, $L^2$, $L^{34}$, $L^{35}$, $L^{56}$, $L^{66}$ and $L^{67}$ each is preferably an unsubstituted methine group.

n3, n4, n51, n52, n61 and n62 each represents 0, 1, 2, 3 or 4 and when each is 2 or more, the methine group is repeated but those methine groups may not be the same. n3, n4, n51 and n62 each is preferably 0, 1, 2 or 3, more preferably 0, 1 or 2, still more preferably 0 or 1. n52 and n61 each is preferably 0 or 1, more preferably 0.

p3, p5 and p6 each independently represents 0 or 1, preferably 0.

$M^3$, $M^4$, $M^5$ and $M^6$ each represents a counter ion and preferred examples thereof include those described above for M. m3, m4, m5 and m6 each represents a number of 0 or more, preferably from 0 to 4, necessary for neutralizing the electric charge within the molecule and when an inner salt is formed, m3, m4, m5 and m6 each is 0.

Among formulae (IA), (IB), (IC) and (ID), the methine dye represented by formula (I) is preferably a cyanine dye (IA). The cyanine dye (IA) is more preferably represented by formula (II).

The dye represented by formula (II) is described in detail below.

In formula (II), $Y^{11}$ represents an atomic group necessary for forming a pyrrole ring, a furan ring or a thiophene ring or an atomic group necessary for forming an indole ring, a benzofuran ring or a benzotiophene ring, which may be condensed with another carbon ring or heterocyclic ring or may have a substituent, however, which is preferably not condensed with another ring. The ring formed by $Y^{11}$ is preferably a pyrrole ring, a furan ring or a thiophene ring.

$X^{11}$ represents an oxygen atom, a sulfur atom, a selenium atom or $NR^{13}$, preferably an oxygen atom, a sulfur atom or $NR^{13}$, more preferably an oxygen atom or a sulfur atom.

The nitrogen-containing heterocyclic ring formed by $Z^{11}$ may be condensed with a carbon ring such as benzene ring, cyclohexene ring or naphthalene ring, or a heterocyclic ring such as furan ring or thiophene ring. The ring condensed is preferably a carbon ring, more preferably a benzene ring.

The nitrogen-containing heterocyclic ring formed by $Z^{11}$ is preferably a thiazoline ring, a thiazole ring, a benzothiazole ring, an oxazoline ring, an oxazole ring, a benzoxazole ring, a selenazoline ring, a selenazole ring, a benzoselenazole ring, a tellurazoline ring, a tellurazole ring, a benzotellurazole ring, a 3,3-dialkylindolenine ring (e.g., 3,3-dimethylindolenine), an imidazoline ring, an imidazole ring, a benzimidazole ring, an isooxazole ring, an isothiazole ring, a pyrazole ring, a 2-pyridine ring, a 4-pyridine ring, a 2-quinoline ring, a 4-quinoline ring, a 1-isoquinoline ring, a 3-isoquinoline ring, an imidazo[4,5-b]quinoxaline ring, an oxadiazole ring, a thiadiazole ring, a tetrazole ring, a pyrimidine ring or a ring resultant from condensing a benzene ring to the above-described rings.

Among these, preferred are a benzoxazole ring, a benzothiazole ring, a benzimidazole ring and a quinoline ring, more preferred are a benzoxazole ring and a benzothiazole ring. These rings each may be substituted by the above-described substituent represented by V. Specific examples of the nitrogen-containing heterocyclic ring formed by $Z^{11}$ include those described as examples of $Z_{11}$, $Z_{12}$, $Z_{13}$, $Z_{14}$ and $Z_{16}$ in U.S. Pat. No. 5,340,694, columns 23 and 24.

Examples of the alkyl group, the aryl group and the heterocyclic group represented by $R^{11}$, $R^{12}$ and $R^{13}$ include the groups described for R in the methine dye of formula (I). $R^{11}$ and $R^{12}$ each is preferably an alkyl group substituted by an acid group or a group having a dissociative proton, more preferably a substituted alkyl group containing any one of a carboxyl group, a sulfo group, —$CONHSO_2$—, —$SO_2NHSO_2$—, —CONHCO— and —$SO_2NHCO$—, still more preferably a 2-sulfoethyl group, a 3-sulfopropyl group, a 3-sulfobutyl group, a 4-sulfobutyl group, a carboxymethyl group or a methanesulfonylcarbamoylmethyl group.

$R^{13}$ is preferably an unsubstituted alkyl group, more preferably a methyl group or an ethyl group.

The methine group represented by $L^{11}$, $L^{12}$, $L^{13}$, $L^{14}$ and $L^{15}$ may be unsubstituted or substituted and examples of the substituent include the above-described substituents represented by V.

$L^{14}$ and $L^{15}$ each is preferably an unsubstituted methine group.

n1 represents 0, 1, 2, 3 or 4, preferably 0, 1, 2 or 3, more preferably 0, 1 or 2, still more preferably 0 or 1, and when n1 is 2 or more, the methine group is repeated but those methine groups may not be the same.

p1 represents 0 or 1, preferably 0.

Examples of $M^1$ include those described above as the ion for M in the methine dye of formula (I). $M^1$ is preferably cation and preferred examples of the cation include sodium, potassium, triethylammonium, pyridinium and N-ethylpyridinium.

m1 represents a number of 0 or more necessary for neutralizing the electric charge within the molecule, preferably 0, 1, 2 or 3, and when an inner salt is formed, m1 is 0.

The methine dye represented by formula (II) is preferably represented by formula (III).

The dye represented by formula (III) is described in detail below.

In formula (III), the ring formed by $Y^{21}$ is selected from a pyrrole ring, a furan ring and a thiophene ring.

The ring formed by $Y^{21}$ may be condensed in any direction but, taking a thiophene ring as an example, out of the thieno[3,2-d]azole type where the sulfur atom of the thiophene ring is present in the same side as $X^{21}$ with respect to the condensed carbon-carbon bond (the type of formula (c)), the thieno[2,3-d]azole type where the sulfur atom of the thiophene ring is present in the opposite side to $X^{21}$ (the type of formula (a)) and the thieno[3,4-d]azole type where the another ring is condensed at 3-position and 4-position of the thiophene ring (the type of formula (b)), the former two types are preferred. In the case where the dye is required to have spectral absorption in the long wavelength region as a sensitizing dye, the type of formula (a) is more preferred.

The ring formed by $Y^{21}$ preferably has a substituent on the ring and examples of the substituent include the above-described substituents represented by V. The substituent is preferably an alkyl group (e.g., methyl), an aryl group (e.g., phenyl), an aromatic heterocyclic group (e.g., 1-pyrrolyl), an alkoxy group (e.g., methoxy), an alkylthio group (e.g., methylthio), a cyano group or a halogen atom (e.g., fluorine, chlorine, bromine, iodine), more preferably a chlorine atom or a bromine atom.

$X^{21}$ and $X^{22}$ each represents an oxygen atom, a sulfur atom, a selenium atom or $NR^{23}$, preferably an oxygen atom, a sulfur atom or $NR^{23}$, more preferably an oxygen atom or a sulfur atom, still more preferably a sulfur atom.

Examples of the alkyl group, the aryl group and the heterocyclic group represented by $R^{21}$, $R^{22}$ and $R^{23}$ include the groups described above for R in the methine dye of formula (I). $R^{21}$ and $R^{22}$ each is preferably an alkyl group substituted by an acid group or a group having a dissociative proton, more preferably a substituted alkyl group containing any one of a carboxyl group, a sulfo group, —CONHSO$_2$—, —SO$_2$NHSO$_2$—, —CONHCO— and —SO$_2$NHCO—, still more preferably a 2-sulfoethyl group, a 3-sulfopropyl group, a 3-sulfobutyl group, a 4-sulfobutyl group, a carboxymethyl group or a methanesulfonylcarbamoylmethyl group. Furthermore preferably, either one of $R^{21}$ and $R^{22}$ is a 2-sulfoethyl group, a 3-sulfopropyl group, a 3-sulfobutyl group or a 4-sulfobutyl group and another one is a carboxymethyl group or a methanesulfonylcarbamoylmethyl group.

$R^{23}$ is preferably an unsubstituted alkyl group, more preferably a methyl group or an ethyl group.

Examples of the substituents represented by $V^{21}$, $V^{22}$, $V^{23}$ and $V^{24}$ include the above-described substituents represented by V, however, two adjacent substituents are not combined with each other to form an unsaturated condensed ring. $V^{21}$ and $V^{24}$ each is preferably a hydrogen atom and $V^{22}$ and $V^{23}$ each is preferably a hydrogen atom, an alkyl group (e.g., methyl), an aryl group (e.g., phenyl), an aromatic heterocyclic group (e.g., 1-pyrrolyl), an alkoxy group (e.g., methoxy), an alkylthio group (e.g., methylthio), a cyano group or a halogen atom (e.g., fluorine, chlorine, bromine, iodine). $V^{23}$ is more preferably a hydrogen atom and $V^{22}$ is more preferably a halogen atom, still more preferably a chlorine atom or a bromine atom.

The methine group represented by $L^{21}$, $L^{22}$ and $L^{23}$ may be unsubstituted or substituted and examples of the substituent include the above-described substituents represented by V.

n2 represents 0, 1, 2, 3 or 4 and when n2 is 2 or more, the methine group is repeated but those methine groups may not be the same. n2 is preferably 0, 1, 2 or 3, more preferably 0, 1 or 2, still more preferably 0 or 1.

When n2 is 0, $L^{21}$ is preferably an unsubstituted methine group and when n2 is 1, $L^{22}$ is preferably a methine group substituted by an unsubstituted alkyl group, more preferably a methyl-substituted methine group or an ethyl-substituted methine group, and $L^{21}$ and $L^{23}$ each is preferably an unsubstituted methine group.

Examples of $M^2$ include the ions described above for M in the methine dye of formula (I). $M^2$ is preferably cation and preferred examples thereof include sodium, potassium, triethylammonium, pyridinium and N-ethylpyridium.

$m^2$ represents a number of 0 or more necessary for neutralizing the electric charge within the molecule, preferably 0, 1, 2 or 3, and when an inner salt is formed, $m^2$ is 0.

Preferred embodiments of the compound of formula (I) for use in the silver halide emulsion of the present invention are described in more detail below.

In the case of using this compound in a red-sensitive emulsion layer, the compound of formula (I) is preferably represented by formula (III) where one of $X^{21}$ and $X^{22}$ is an oxygen atom and another is a sulfur atom; $Y^{21}$ is a pyrrole, furan or thiophene ring substituted by a halogen atom; $R^{21}$ and $R^{22}$ each is a sulfoalkyl group, a carboxyalkyl group or an alkylsulfonylcarbamoylalkyl group; n2 is 1; $L^{21}$ and $L^{23}$ each is an unsubstituted methine group; $L^{22}$ is a methyl-substituted methine group or an ethyl-substituted methine group; $V^{21}$, $V^{23}$ and $V^{24}$ each is a hydrogen atom; $V^{22}$ is an alkyl group (e.g., methyl), an alkoxy group (e.g., methoxy), an alkylthio group (e.g., methylthio), a cyano group or a halogen atom (e.g., fluorine, chlorine, bromine, iodine), more preferably a halogen atom; $M^2$ is an organic or inorganic monovalent cation; and m2 is 0 or 1.

In the case of using this compound in a green-sensitive emulsion layer, the compound of formula (I) is preferably represented by formula (III) where $X^{21}$ and $X^{22}$ both are an oxygen atom; $Y^{21}$ is a pyrrole, furan or thiophene ring substituted by a chlorine atom or a bromine atom; $R^{21}$ and $R^{22}$ each is a sulfoalkyl group, a carboxyalkyl group or an alkylsulfonylcarbamoylalkyl group; n2 is 1; $L^{21}$ and $L^{23}$ each is an unsubstituted methine group; $L^{22}$ is a methyl-substituted methine group or an ethyl-substituted methine group; $V^{21}$, $V^{23}$ and $V^{24}$ each is a hydrogen atom; $V^{22}$ is an alkyl group (e.g., methyl), an aryl group (e.g., phenyl), an aromatic heterocyclic group (e.g., 2-thienyl), an alkoxy group (e.g., methoxy), an alkylthio group (e.g., methylthio), a cyano group or a halogen atom (e.g., fluorine, chlorine, bromine, iodine), more preferably a halogen atom; $M^2$ is an organic or inorganic monovalent cation; and m2 is 0 or 1.

In the case of using this compound in a blue-sensitive emulsion layer, the compound of formula (I) is preferably represented by formula (III) where $X^{21}$ and $X^{22}$ both are a sulfur atom; $Y^{21}$ is a thiophene ring substituted by a halogen atom; $R^{21}$ and $R^{22}$ each is a sulfoalkyl group, a carboxyalkyl group or an alkylsulfonylcarbamoylalkyl group; n2 is 0; $L^{21}$ is an unsubstituted methine group; $V^{21}$, $V^{23}$ and $V^{24}$ each is a hydrogen atom, $V^{22}$ is an alkyl group (e.g., methyl), an alkoxy group (e.g., methoxy), an alkylthio group (e.g., methylthio), a cyano group or a halogen atom (e.g., fluorine, chlorine, bromine, iodine), more preferably a halogen atom, still more preferably a chlorine atom or a bromine atom; $M^2$ is an organic or inorganic monovalent cation; and m2 is 0 or 1.

Specific examples of the compound represented by formula (I) (including the compounds represented by formulae (II) and (III) as lower concepts) of the present invention are set forth below, however, the present invention is not limited thereto.

Other than those shown below, the compound may also be selected from Methine Dyes S-1 to S-95 described in Japanese Patent Application No. 2000-124612.

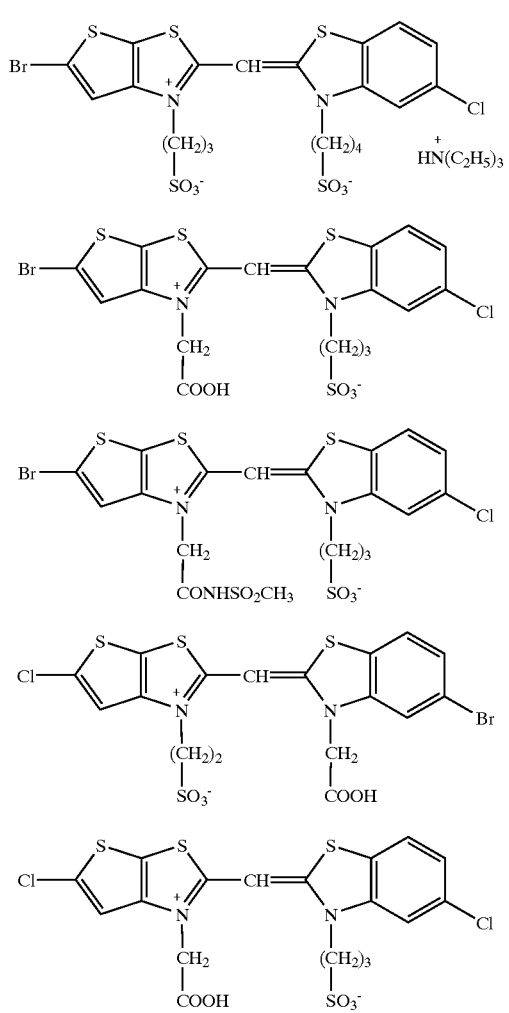

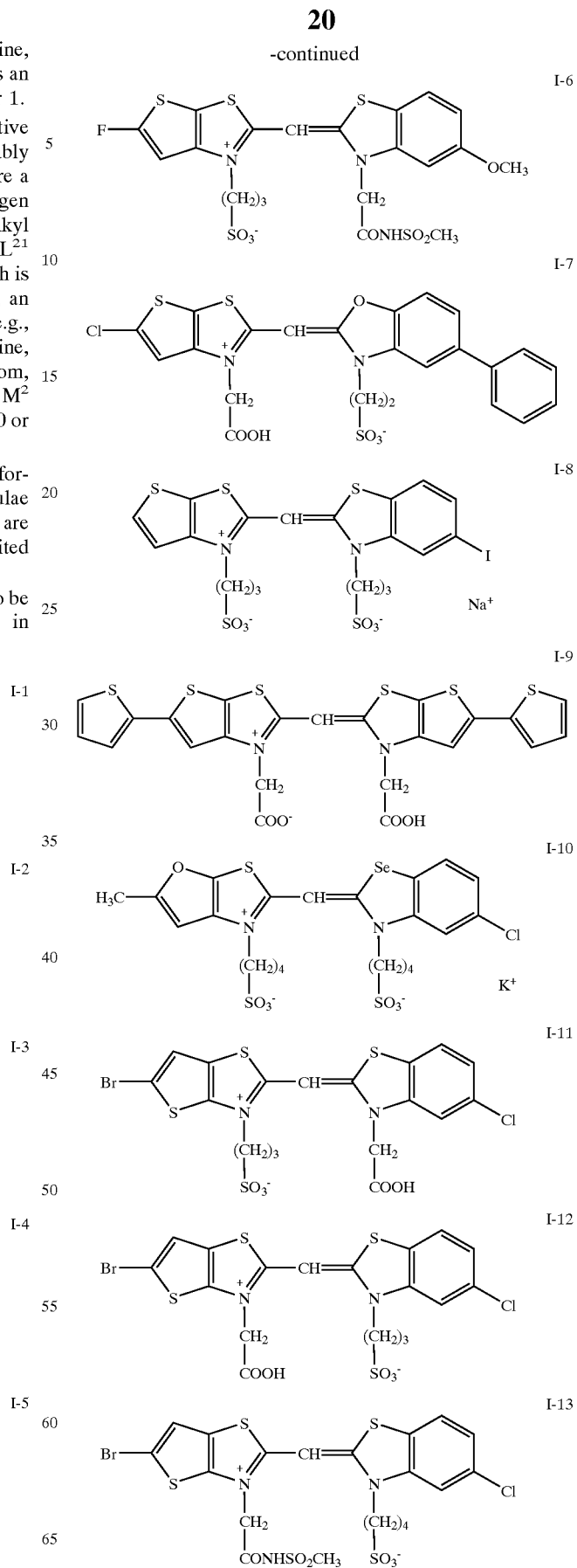

-continued
I-14
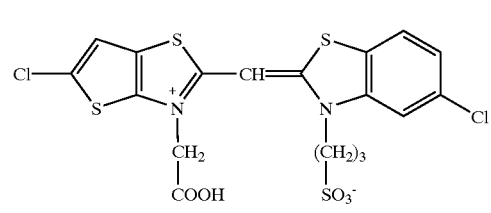
I-15
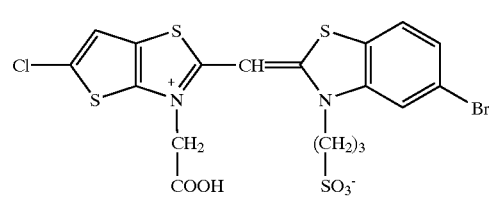
I-16
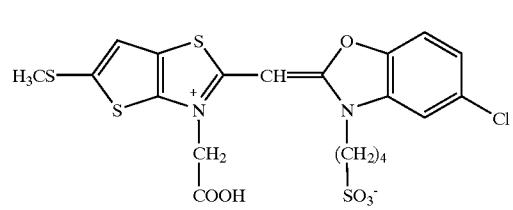
I-17
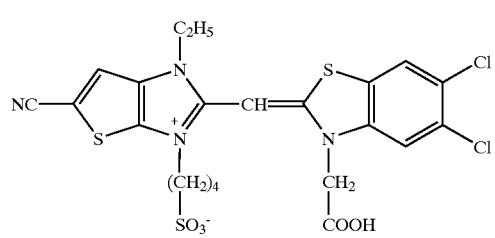
I-18
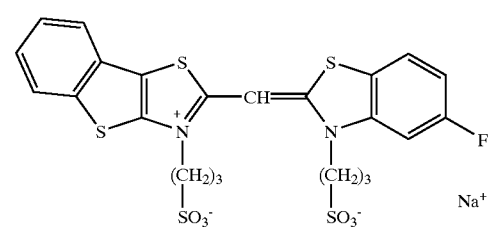
I-19
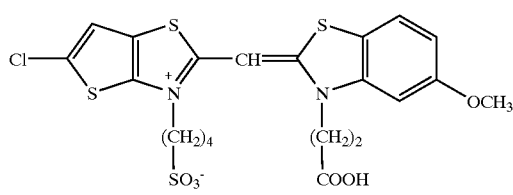
I-20
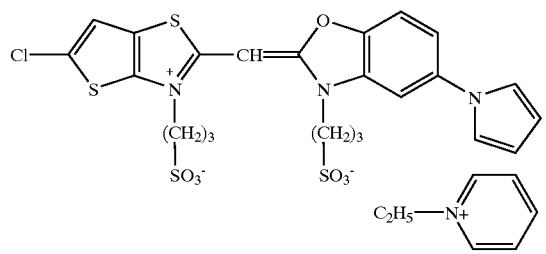
I-21
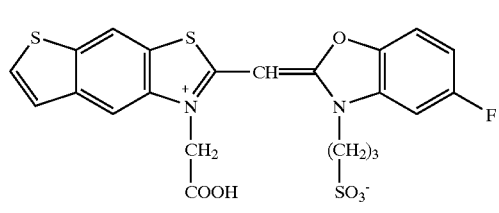
I-22
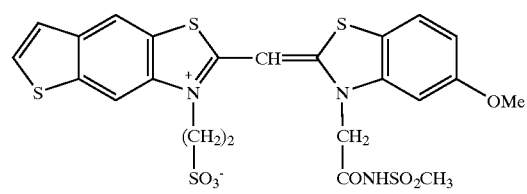
I-23
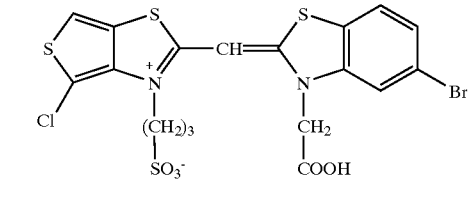
I-24
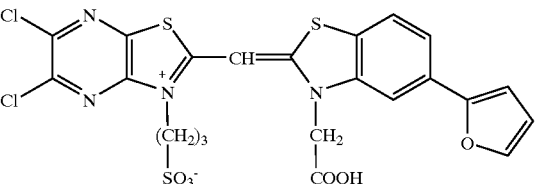
I-25
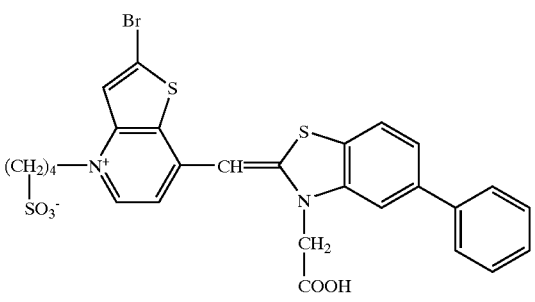
I-26
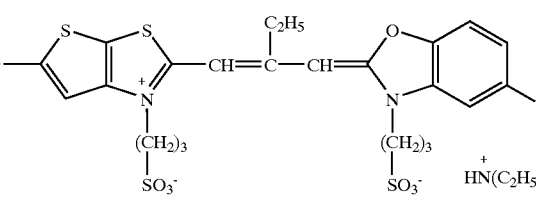
I-27
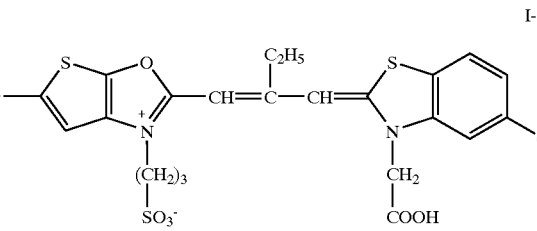

-continued
I-28
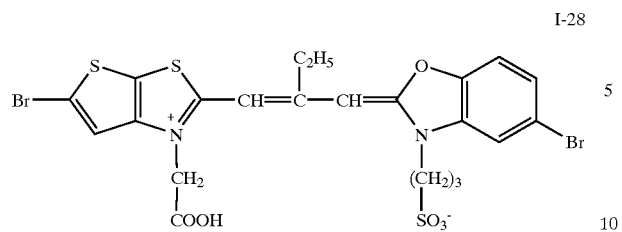
I-29
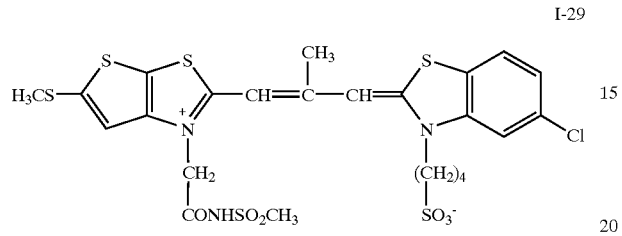
I-30
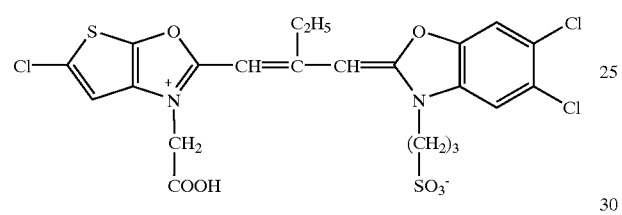
I-31
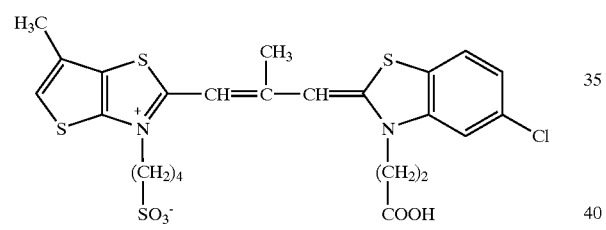
I-32
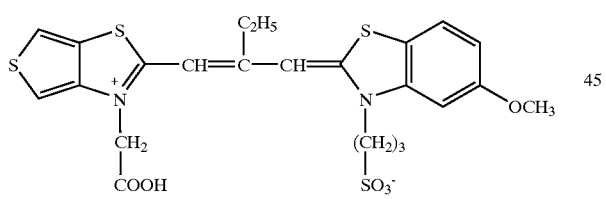
I-33
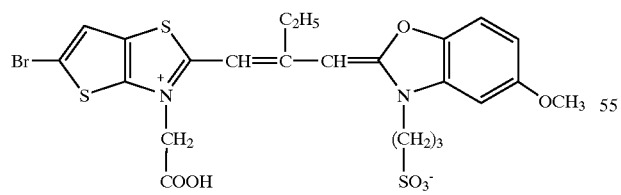
I-34
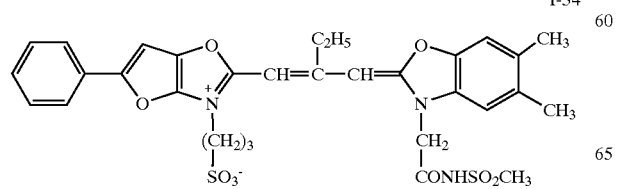
-continued
I-35
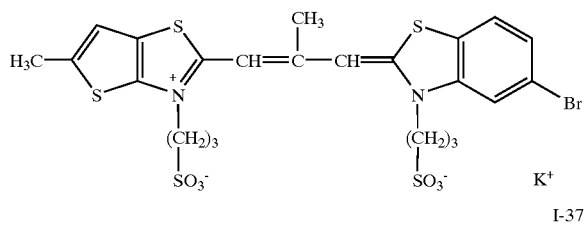
I-36
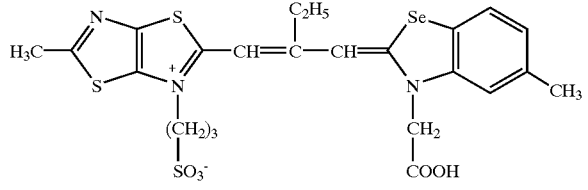
I-37
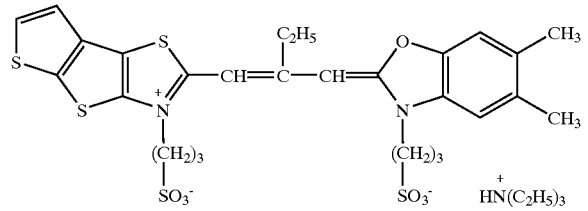
I-38
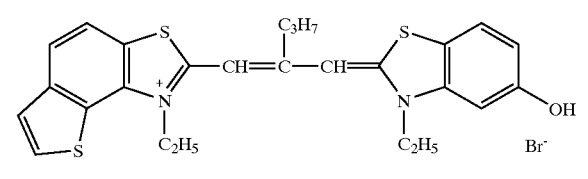
I-39
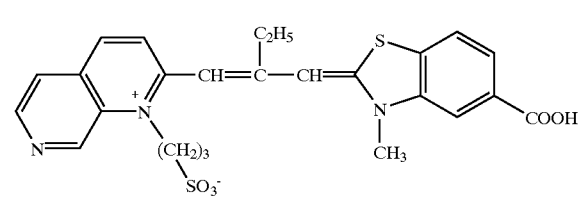
I-40
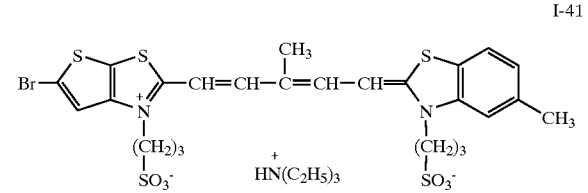
I-41

-continued

I-42
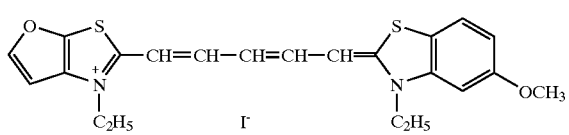

I-43
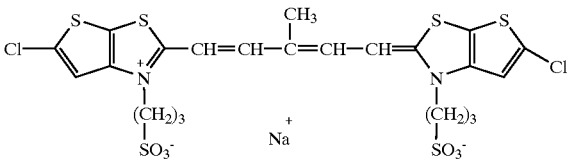

I-44
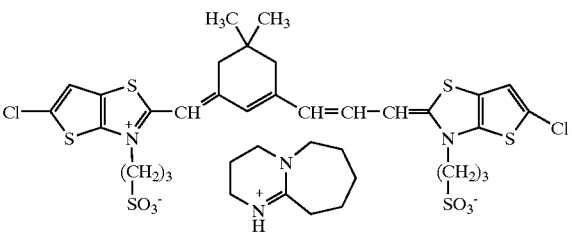

I-45
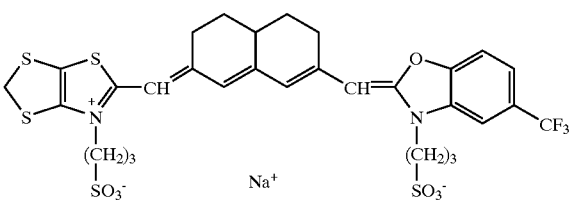

I-46
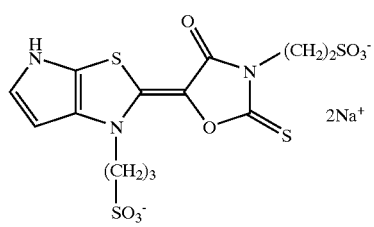

I-47
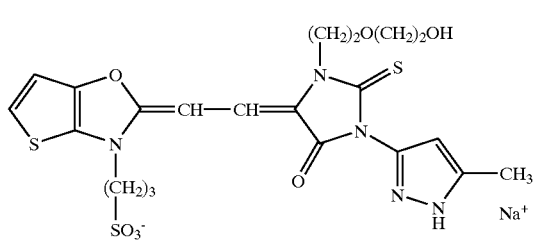

I-48
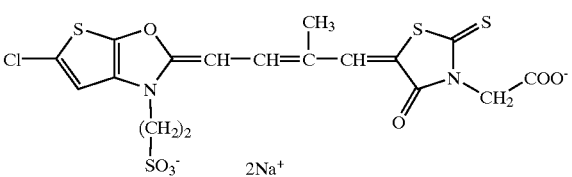

-continued

I-49
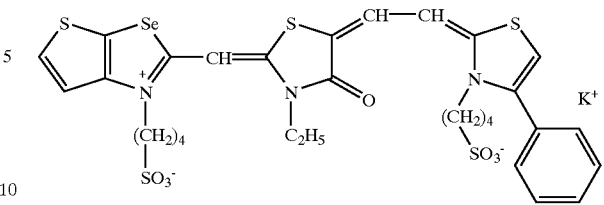

I-50
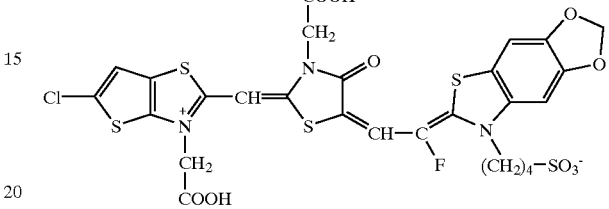

The compound represented by formula (I) (including the compounds of lower concepts) of the present invention can be synthesized by the methods described in F. M. Harmer, *Heterocyclic Compounds—Cyanine Dyes and Related Compounds*, John Wiley & Sons, New York, London (1964), D. M. Sturmer, *Heterocyclic Compounds—Special topics in heterocyclic chemistry*, Chap. 18, Sec. 14, pp. 482–515, John Wiley & Sons, New York, London (1977), and *Rodd's Chemistry of Carbon Compounds*, 2nd ed., Vol. IV, Part B, Chap. 15, pp. 369–422, Elsevier Science Publishing Company Inc., New York (1977).

The compounds represented by formula (I) of the present invention may be used in combination of two or more thereof.

Also, the compound of formula (I) for use in the present invention may be used in combination with another sensitizing dye other than the compound of the present invention, within the same emulsion. The dye used in combination is preferably a cyanine dye, a merocyanine dye, a rhodacyanine dye, a trinuclear merocyanine dye, a tetranuclear merocyanine dye, an allopolar dye, a hemicyanine dye or a styryl dye, more preferably a cyanine dye, a merocyanine dye or a rhodacyanine dye, still more preferably a cyanine dye. These dyes are described in detail in F. M. Harmer, *Heterocyclic Compounds—Cyanine Dye and Related Compounds*, John Wiley & Sons, New York, London (1964), D. M. Sturmer, *Heterocyclic Compounds—Special topics in heterocyclic chemistry*, Chap. 18, Section 14, pp. 482–515.

Examples of preferred dyes include the sensitizing dyes represented by the formulae or set forth as specific examples in U.S. Pat. No. 5,994,051, pp. 32–44, and U.S. Pat. No. 5,747,236, pp. 30–39.

For cyanine dyes, merocyanine dyes and rhodacyanine dyes, formulae (XI), (XII) and (XIII) described in U.S. Pat. No. 5,340,694, columns 21 and 22, are preferred (on the condition that the numbers of $n_{12}$, $n_{15}$, $n_{17}$ and $n_{18}$ are not limited and each is an integer of 0 or more (preferably 4 or less)).

These sensitizing dyes, which can be used in combination with the compound of formula (I), may be used individually or in combination of two or more thereof and when two or more dyes are used, a combination of providing supersensitization effect is preferred. Typical examples thereof include those described in U.S. Pat. Nos. 2,688,545, 2,977,229, 3,397,060, 3,522,052, 3,527,641, 3,617,293, 3,628,964, 3,666,480, 3,672,898, 3,679,428, 3,303,377, 3,769,301, 3,814,609, 3,837,862 and 4,026,707, British Patents 1,344,281 and 1,507,803, JP-B-43-49336 (the term "JP-B" as used herein means an "examined Japanese patent publication") and JP-B-53-12375, JP-A-52-110618 and JP-A-52-109925.

Together with the sensitizing dye, a dye which itself has no spectral sensitization effect or a substance which absorbs substantially no visible light, but which exhibits supersensitization may be contained in the emulsion.

Examples of the supersensitizer (for example, pyrimidylamino compounds, triazinylamino compounds, azolium compounds, aminostyryl compounds, aromatic organic formaldehyde condensates, azaindene compounds, cadmium salts) useful in the spectral sensitization of the present invention and examples of the combination of a supersensitizer with a sensitizing dye are described in U.S. Pat. Nos. 3,511,664, 3,615,613, 3,615,632, 3,615,641, 4,596,767, 4,945,038, 4,965,182, 2,933,390, 3,635,721, 3,743,510, 3,617,295 and 3,635,721. With respect to the use method thereof, those described in these patents are also preferred.

The silver halide photographic emulsion and the silver halide photographic light-sensitive material according to the present invention are described in detail below.

The methine dye (the same applies to other sensitizing dye or supersensitizer) of formula (I) for use in the present invention may be added to the silver halide emulsion according to the present invention in any step heretofore recognized as useful during the preparation of the emulsion. The methine dye may be added at any time or in any step as long as it is before the coating of the emulsion, for example, during the formation and/or in the period before the desalting of silver halide grains, during the desalting and/or in the period from the desalting until the initiation of chemical ripening as disclosed in U.S. Pat. Nos. 2,735,766, 3,628,960, 4,183,756 and 4,225,666, JP-A-58-184142 and JP-A-60-196749, immediately before or during the chemical ripening, or in the period from the chemical ripening until the coating as disclosed in JP-A-58-113920. Also, as disclosed in U.S. Pat. No. 4,225,666 and JP-A-58-7629, the same compound by itself or in combination with a compound having a foreign structure may be added in parts, for example, one part during the grain formation and another part during the chemical ripening or after the completion of chemical ripening, or one part before or during the chemical ripening and another part after the completion of chemical ripening. When added in parts, the kind of the compound or the combination of compounds may be varied.

The amount added of the methine dye (the same applies to other sensitizing dye or supersensitizer) for use in the present invention varies depending on the shape and size of silver halide grain, however, the methine dye can be used in an amount of $1\times10^{-6}$ to $8\times10^{-3}$ mol per mol of silver halide. For example, when the silver halide grain size is from 0.2 to 1.3 μm, the amount added is preferably from $2\times10^{-6}$ to $3.5\times10^{-3}$, more preferably from $7.5\times10^{-6}$ to $1.5\times10^{-3}$ mol, per mol of silver halide.

The methine dye (the same applies to other sensitizing dye or supersensitizer) for use in the present invention can be dispersed directly in the emulsion or can be added to the emulsion in the form of a solution after dissolving the dye in an appropriate solvent such as methyl alcohol, ethyl alcohol, methyl cellosolve, acetone, water or pyridine or in a mixed solvent thereof. At this time, additives such as a base, an acid or a surfactant can be allowed to be present together. For dissolving the dye, an ultrasonic wave may also be used. In adding the compound, a method of dissolving the compound in a volatile organic solvent, dispersing the solution in a hydrophilic colloid and adding the dispersion to the emulsion described in U.S. Pat. No. 3,469,987, a method of dispersing the compound in a water-soluble solvent and adding the dispersion to the emulsion described in JP-B-46-24185, a method of dissolving the compound in a surfactant and adding the solution to the emulsion described in U.S. Pat. No. 3,822,135, a method of dissolving the compound using a compound capable of red shifting and adding the solution to the emulsion described in JP-A-51-74624, and a method of dissolving the compound in an acid substantially free of water and adding the solution to the emulsion described in JP-A-50-80826 may be used. For the addition to the emulsion, the methods described in U.S. Pat. Nos. 2,912,343, 3,342,605, 2,996,287 and 3,429,835 may also be used.

Examples of the organic solvent which dissolves the methine dye for use in the present invention include methyl alcohol, ethyl alcohol, n-propanol, isopropanol, n-butanol, isobutanol, tert-butanol, benzyl alcohol, fluoroalcohol, methyl cellosolve, acetone, pyridine and a mixed solvent thereof.

In dissolving the methine dye for use in the present invention in water, an organic solvent described above or a mixed solvent thereof, a base is preferably added. The base may be either an organic salt or an organic base and examples thereof include amine derivatives (e.g., triethylamine, triethanolamine), pyridine derivatives, sodium hydroxide, potassium hydroxide, sodium acetate and potassium acetate. The methine dye is preferably dissolved by the method of adding the dye to a mixed solvent of water and methanol and further adding thereto triethylamine equimolar to the dye.

The silver halide emulsion for use in the present invention is described below. The silver halide grain is preferably a cubic or tetradecahedral crystal grain having substantially {100} faces (the grain may have rounded corners and may have a hk1 plane) or an octahedral crystal grain. Alternatively, 50% or more of the entire projected area are preferably occupied by tabular crystal grains comprising a {100} face or a {111} face and having an aspect ratio of 2 or more. The aspect ratio is a value obtained by dividing the diameter of a circle corresponding to the projected area of a grain by the thickness of the grain.

The silver halide emulsion for use in the present invention is a silver chloroiodide or silver chloroiodobromide emulsion and in view of rapid processability, preferably a silver chloroiodide or silver chloroiodobromide emulsion having a silver chloride content of 95 mol % or more, more preferably a silver chloroiodide or silver chlorobromoiodide emulsion having a silver chloride content of 98 mol % or more.

The grain for use in the present invention preferably comprises a core part and a shell part (outermost layer) having a larger iodide content than the core part. In the core part, 90% or more thereof preferably comprises silver chloride. The core part may comprise two or more moieties different in the halogen composition. The silver iodide content of the core part is preferably 0.5 mol % or less, more preferably 0.1 mol % of less, per mol of the total silver.

The shell part preferably occupies 50% or less, more preferably 20% or less, in the entire volume of a grain. The shell part preferably has a silver iodochloride phase in a proportion of 0.1 to 1.0 mol %, more preferably from 0.2 to 0.60 mol %, per mol of the total silver, whereby high sensitivity and excellent suitability for high-intensity exposure can be advantageously attained. However, the position where iodide ion is introduced is restricted from the standpoint of obtaining a high-sensitivity and low-fogging emulsion. As the iodide ion is introduced more inside an emulsion grain, the elevation of sensitivity is smaller. Therefore, an iodide salt solution is preferably added to the region outside 50% of the grain volume, more preferably outside 70%, most preferably outside 80%. At the same time, the addition of the iodide salt solution is preferably finished inside 98% of the grain volume, most preferably inside 96%. By finishing the addition of the iodide salt solution slightly inside the grain surface, the obtained emulsion can have higher sensitivity and lower fogging.

The iodide ion may be introduced by adding an iodide salt solution solely or by adding an iodide salt solution together with the addition of a silver salt solution and a high chloride salt solution. In the latter case, the iodide salt solution and the high chloride solution may be added separately or a mixed solution of iodide salt and high chloride salt may be added. The iodide salt is added in the form of a soluble salt such as alkali or alkaline earth iodide salt. The iodide may also be introduced by cleaving iodide ion from an organic molecule as described in U.S. Pat. No. 5,389,508. Also, fine silver iodide grain may be used as another iodide ion source.

The iodide salt solution may be added concentrically at a certain period in the grain formation or may be added over a certain period of time.

The distribution of iodide ion concentration in the depth direction inside a grain can be measured by an etching/TOF-SIMS (Time of Flight-Secondary Ion Mass Spectrometry) method using, for example, TRIFTII-type TOF-SIMS manufactured by Phi Evans. The TOF-SIMS method is specifically described in *Hyomen Bunseki Gijutsu Sensho Niji Ion Shituryou Bunseki Ho* (*Surface Analysis Technology Selection, Secondary Ion Mass Spectrometry*), compiled by Nippon Hyomen Kagaku Kai, issued by Maruzen (1999). When emulsion grains are analyzed by the etching/TOF-SIMS method, the analysis may show that even if the addition of iodide salt solution is finished inside a grain, the iodide ion is bleeding out toward the grain surface. In the case where the emulsion of the present invention contains silver iodide, it is preferably shown in the analysis by the etching/TOF-SIMS method that the iodide ion has a concentration maximum on the grain surface and the iodide ion concentration is attenuated toward the inside.

In the silver halide grain for use in the present invention, a hexacyano-complex is doped. The center metal which forms a complex with cyan ion may be a metal described in U.S. Pat. No. 5,518,871 but is preferably iron or ruthenium. The hexacyano-complex can be doped at any stage during the grain formation but is preferably doped into the area inside 3% or more of the grain volume. The hexacyano-complex is added in an amount of $1 \times 10^{-7}$ mol or more per mol of silver during the grain formation, but is preferably added in an amount of $1 \times 10^{-7}$ to $1 \times 10^{-2}$ mol, most preferably from $1 \times 10^{-6}$ to $5 \times 10^{-4}$ mol.

In the present invention, an iridium complex is preferably doped. The ligand is preferably fluoride ion, chloride ion, bromide ion or iodide ion, more preferably chloride ion or bromide ion. Also, a so-called organic compound described in U.S. Pat. Nos. 5,360,712, 5,457,021 and 5,462,849 may also be coordinated as the ligand. It is also preferred to coordinate $H_2O$ as the ligand. Specific preferred examples of the iridium complex include $[IrCl_6]^{3-}$, $[IrCl_6]^{2-}$, $[IrCl_5(H_2O)]^{2-}$, $[IrCl_5(H_2O)]^{-}$, $[IrCl_4(H_2O)_2]^{-}$, $[IrCl_4(H_2O)_2]^{0}$, $[IrCl_3(H_2O)_3]^{0}$, $[IrCl_3(H_2O)_3]^{+}$, $[IrBr_6]^{3-}$, $[IrBr_6]^{2-}$, $[IrBr_5(H_2O)]^{2-}$, $[IrBr_5(H_2O)]^{-}$, $[IrBr_4(H_2O)_2]^{-}$, $[IrBr_4(H_2O)_2]^{0}$, $[IrBr_3(H_2O)_3]^{0}$ and $[IrBr_3(H_2O)_3]^{+}$. This iridium complex is preferably added during the grain formation in an amount of $1 \times 10^{-10}$ to $1 \times 10^{-3}$ mol, most preferably from $1 \times 10^{-8}$ to $1 \times 10^{-5}$ mol, per mol of silver.

In the case where the emulsion of the present invention contains a silver bromide localized phase, a silver bromide localized phase having a silver bromide content of at least 10 mol % different from the neighborhood is preferably formed on the grain surface. The silver bromide content of the silver bromide localized phase is preferably from 10 to 60 mol %, most preferably from 20 to 50 mol %. The silver bromide localized phase is preferably constituted by from 0.1 to 5 mol % of silver, more preferably from 0.3 to 4 mol % of silver, based on the total amount of silver constituting the silver halide grain for use in the present invention. The silver bromide localized phase preferably contains Ir-complex ion such as iridium(III) chloride, iridium(III) bromide, iridium (IV) chloride, sodium hexachloroiridium(III), potassium hexachloroiridium(IV), hexaammineiridium(IV) salt, trioxalatoiridium(III) salt and trioxalatoiridium(IV) salt. The amount added of this compound varies over a wide range according to the purpose but is preferably from $10^{-9}$ to $10^{-2}$ mol per mol of silver halide.

In the silver halide grain for use in the present invention, ion of a metal selected from Group VIII metals in the periodic table, namely, osmium, rhodium, platinum, ruthenium, palladium, cobalt and nickel, or a complex ion thereof may be used and these ions may be used individually or in combination. Furthermore, multiple kinds of metals may also be used.

The above-described metal ion-providing compound can be incorporated into the silver halide grain of the present invention by adding the compound to an aqueous solution working out to a dispersion medium at the formation of silver halide grains, such as aqueous gelatin solution, aqueous halide solution, aqueous silver salt solution or other aqueous solution, or by previously incorporating the metal ion into a silver halide fine grain, adding the fine grain to the silver halide emulsion and dissolving this emulsion. The metal ion may be incorporated into the grain at any step before, during or immediately after the grain formation but the timing of addition is determined depending on to which position or in what amount the metal ion is incorporated into the grain.

Other than the Group VIII metals, various polyvalent metal ion impurities can be introduced into the silver halide emulsion for use in the present invention during the formation or physical ripening of emulsion grains. The amount added of this compound varies over a wide range depending on the purpose but is preferably from $10^{-9}$ to $10^{-2}$ mol per mol of silver halide.

The silver halide grain contained in the silver halide emulsion for use in the present invention preferably has an average grain size (a number average of grain sizes, by taking the diameter of a circle equivalent to the projected area of a grain as the grain size) of 0.1 to 2 μm.

The grain size distribution is preferably so-called monodisperse, where the coefficient of variation (obtained by dividing the standard deviation of the grain size distribution by an average grain size) is preferably 20% or less, preferably 15% or less, more preferably 10% or less. For the purpose of obtaining a wide latitude, it is preferred to blend and use this monodisperse emulsion in the same layer or to apply the monodisperse emulsion in multiple layers.

The silver halide emulsion for use in the present invention may contain various compounds or precursors thereof for the purpose of preventing fogging during the production, storage or photographic processing of a light-sensitive material or for stabilizing the photographic performance. With respect to specific examples of such compounds, those described in JP-A-62-215272 supra., pages 39 to 72 are preferably used. In addition, 5-arylamino-1,2,3,4-thiatriazole compounds (the aryl residue having at least one electron-withdrawing group) described in EP04547647 are also preferably used.

For elevating storability of the silver halide emulsion, the following compounds are preferably used in the present invention: hydroxamic acid derivatives described in JP-A-11-109576; cyclic ketones having in adjacency to the carbonyl group a double bond with both ends being substituted by an amino group or a hydroxyl group described in JP-A-11-327094 (in particular, those represented by formula (S1); the paragraphs 0036 to 0071 may be incorporated into the present specification by reference); sulfo-substituted catechol and hydroquinones (for example, 4,5-dihydroxy-1,3-benzenedisulfonic acid, 2,5-dihydroxy-1,4-benzenedisulfonic acid, 3,4-dihydroxybenzenesulfonic acid, 2,3-dihydroxybenzenesulfonic acid, 2,5-dihydroxybenzenesulfonic acid, 3,4,5-trihydroxybenzenesulfonic acid and salts thereof) described in JP-A-11-143011; and water-soluble reducing agents represented by formulae (I) to (III) of JP-A-11-102045.

The silver halide emulsion for use in the present invention is usually subjected to chemical sensitization. The chemical sensitization may be performed using sulfur sensitization of adding a labile sulfur compound, noble metal sensitization represented by gold sensitization, and reduction sensitization, individually or in combination. Preferred examples of the compounds for use in the chemical sensitization include those described in JP-A-62-215272, page 18, right lower column to page 22, right upper column. In particular, the silver halide emulsion is preferably subjected to gold sensitization. By virtue of gold sensitization, fluctuation in the photographic performance upon scan exposure with a laser ray or the like can be more reduced.

In the gold sensitization of the silver halide emulsion for use in the present invention, various inorganic compounds, Au(I) complexes having an inorganic ligand and Au(I) compounds having an organic ligand may be used. Examples of the inorganic compound include chloroauric acid and salts thereof, and examples of the Au(I) complex having an inorganic ligand include aurous dithiocyanate compounds such as potassium aurous(I) dithiocyanate, and aurous dithiosulfate compounds such as trisodium aurous(I) dithiosulfate.

Examples of the Au(I) compound having an organic ligand, which can be used, include bis-Au(I) mesoionic heterocycles such as bis(1,4,5-trimethyl-1,2,4-triazolium-3-thiolate) Au(I) tetrafluoroborate described in JP-A-4-267249, organic mercapto Au(I) complexes such as potassium bis(1-[3-(2-sulfonatobenzamide)phenyl]-5-mercaptotetrazole potassium salt) aurate(I) pentahydrate described in JP-A-11-218870, and Au(I) compounds coordinated with nitrogen compound anion such as bis(1-methylhydantoinato) Au(I) sodium salt tetrahydrate described in JP-A-4-268550. In addition, Au(I) thiolate compounds described in U.S. Pat. No. 3,503,749, gold compounds described in JP-A-8-69074, JP-A-8-69075 and JP-A-9-269554, and compounds described in U.S. Pat. Nos. 5,620,841, 5,912,112, 5,620,841, 5,939,245 and 5,912,111 may also be used. The amount of such a compound added may vary over a wide range according to the case but is usually from $5 \times 10^{-7}$ to $5 \times 10^{-3}$ mol, preferably from $5 \times 10^{-6}$ to $5 \times 10^{-4}$ mol, per mol of silver halide.

A colloidal gold sulfide may also be used and the production method thereof is described in *Research Disclosure*, No. 37154, *Solid State Ionics*, Vol. 79, pp. 60–66 (1995), and *Compt. Rend. Hebt. Seances*, Vol. 263, page 1328, Acad. Sci. Sect. B (1966). The colloidal gold sulfide may have various sizes and even those having a particle size of 50 nm or less may be used. The amount added thereof may vary over a wide range depending on the case but is usually, in terms of gold atom, from $5 \times 10^{-7}$ to $5 \times 10^{-3}$ mol, preferably from $5 \times 10^{-6}$ to $5 \times 10^{-4}$ mol, per mol of silver halide.

In the present invention, the gold sensitization may be combined with another sensitization such as sulfur sensitization, selenium sensitization, tellurium sensitization, reduction sensitization or noble metal sensitization using a compound other than gold compounds.

In the silver halide photographic light-sensitive material of the present invention, conventionally known photographic materials and additives may be used.

For example, the photographic support which can be used includes a transmission-type support and a reflection-type support. Examples of the transmission-type support which can be preferably used include transparent film such as cellulose nitrate film and polyethylene terephthalate, and polyester of 2,6-naphthalenedicarboxylic acid (NDCA) and ethylene glycol (EG) or polyester of NDCA, terephthalic acid and EG, having provided thereon an information recording layer such as magnetic layer. The reflection-type support is particularly preferably a reflective support having laminated thereon a plurality of polyethylene layers or polyester layers and containing a white pigment such as titanium oxide in at least one of these water-resistant resin layers (laminated layers).

The reflective support for use in the present invention is more preferably a reflective support obtained by providing a polyolefin layer having fine holes on a paper substrate in the side where a silver halide emulsion layer is provided. The polyolefin layer may comprise multiple layers and in this case, it is preferred that the polyolefin layer (for example, polypropylene, polyethylene) adjacent to the gelatin layer in the silver halide emulsion layer side has no fine hole and the polyolefin layer (for example, polypropylene, polyethylene) in the side closer to the paper substrate is formed of polyolefin having fine holes. The density of the polyolefin layer having a multilayer structure or a single layer structure interposed between the paper substrate and a photographic constituent layer is preferably from 0.40 to 1.0 g/ml, more preferably from 0.50 to 0.70 g/ml. The thickness of the polyolefin layer having a multilayer structure or a single layer structure interposed between the paper substrate and a photographic constituent layer is preferably from 10 to 100 $\mu$m, more preferably from 15 to 70 $\mu$m. The ratio of the thickness of the polyolefin layer to the thickness of the paper substrate is preferably from 0.05 to 0.5, more preferably from 0.1 to 0.2.

On the surface opposite the photographic constituent layer (back surface) of the paper support, a polyolefin layer is preferably provided so as to enhance the rigidity of the reflective support. In this case, the polyolefin layer on the back surface is preferably formed of polyethylene or polypropylene having a matted surface, preferably polypropylene. The thickness of the polyolefin layer on the back surface is preferably from 5 to 50 $\mu$m, more preferably from 10 to 30 $\mu$m, and the density thereof is preferably from 0.7 to 1.1 g/ml. Examples of the preferred embodiment of the polyolefin layer provided on the paper substrate of the reflective support for use in the present invention include those described in JP-A-10-333277, JP-A-10-333278, JP-A-11-52513, JP-A-11-65024, EP0880065 and EP0880066.

The above-described water-resistant resin layer preferably contains a fluorescent brightening agent. The fluorescent brightening agent may also be dispersed in a hydrophilic colloid layer of the light-sensitive material. The florescent brightening agent which can be used is preferably a florescent brightening agent of benzoxazole type, coumarin type or pyrazoline type, more preferably a florescent brightening agent of benzoxazolyl naphthalene type or benzoxazolyl stilbene type. The amount used thereof is not particularly limited but is preferably from 1 to 100 mg/m$^2$. In the case of mixing the fluorescent brightening agent in the water-resistant resin, the mixing ratio to the resin is preferably from 0.0005 to 3% by weight, more preferably from 0.001 to 0.5% by weight.

The reflection-type support may also be a support obtained by providing a hydrophilic colloid layer containing a white pigment on the transmission-type support or on the above-described reflection-type support.

The reflection-type support may also have a metal surface with mirror reflection or secondary diffuse reflection.

The support for use in the light-sensitive material of the present invention may be a white polyester-base support for display or a support in which a layer containing a white pigment is provided on the support in the side having a silver halide emulsion layer. Furthermore, in order to improve the sharpness, an antihalation layer is preferably provided on the support in the side where a silver halide emulsion layer is coated or on the back surface thereof. The support is preferably set to have a transmission density of 0.35 to 0.8 so that the display can be viewed with either reflected light or transmitted light.

For the purpose of enhancing the sharpness or the like of an image, the light-sensitive material of the present invention preferably contains a dye capable of decoloration upon processing (particularly, oxonol-base dye) described in EP-A-0337490, pp. 27–76, by adding the dye to a hydrophilic colloid layer such that the light-sensitive material has an optical reflection density at 680 nm of 0.70 or more, or preferably contains 12% by weight or more (more preferably 14% by weight or more) of titanium oxide surface-treated with a di-, tri- or tetra-hydric alcohol (e.g., trimethylolethane), in a water-resistant resin layer of the support.

For the purpose of preventing irradiation or halation or enhancing the safelight immunity or the like, the light-sensitive material of the present invention preferably contains a dye capable of decoloration upon processing (particularly, oxonol dye or cyanine dye) described in EP-A-0337490, pp. 27–76, in a hydrophilic colloid layer. In addition, the dye described in European Patent 0819977 may also be preferably used in the present invention.

Some of these water-soluble dyes worsen the color separation or safelight immunity when the amount used thereof is increased. Examples of the dye which can be used without changing the color separation for the worse include the water-soluble dyes described in JP-A-5-127324, JP-A-5-127325 and JP-A-5-216185.

In the present invention, a colored layer capable of decoloration upon processing is used in place of or in combination with the water-soluble dye. The colored layer capable of decoloration upon processing may be used by directly contacting it with an emulsion layer or may be disposed to contact therewith through an intermediate layer containing a process color mixing inhibitor such as gelatin or hydroquinone. This colored layer is preferably provided as an underlayer (in the support side) of an emulsion layer which forms the primary color as the color of the colored layer. All colored layers corresponding to respective primary colors may be individually provided or only a part thereof may be freely selected and provided. Also, a colored layer subjected to colorings corresponding to a plurality of primary color regions may also be provided. The optical reflection density of the colored layer is preferably such that the optical density value at a wavelength having a highest optical density in the wavelength region used for exposure (in a normal printer exposure, a visible light region of 400 to 700 nm and in the case of scanning exposure, the wavelength of the light source used for the scanning exposure) is from 0.2 to 3.0, more preferably from 0.5 to 2.5, still more preferably from 0.8 to 2.0.

For the formation of the colored layer, a conventionally known method may be used. Examples thereof include a method of incorporating a dye described in JP-A-2-282244, page 3, right upper column to page 8, or a dye described in JP-A-3-7931, page 3, right upper column to page 11, left lower column, which is in the form of a solid fine particle dispersion, into a colloid layer, a method of mordanting an anionic dye to a cationic polymer, a method of adsorbing a dye to a fine particle such as silver halide and thereby fixing the dye in a layer, and a method of using colloidal silver described in JP-A-1-239544. With respect to the method of dispersing fine powder of a dye in the solid state, a method of incorporating fine powder of a dye which is substantially water-insoluble at least at a pH of 6 or less but substantially water-soluble at least at a pH of 8 or more, is described, for example, in JP-A-2-308244, pages 4 to 13. The method of mordanting an anionic dye to a cationic polymer is described, for example, in JP-A-2-84637, pages 18 to 26. Also, the preparation method of colloidal silver as a light absorber is disclosed in U.S. Pat. Nos. 2,688,601 and 3,459,563. Among these methods, the method of incorporating fine powder of a dye and a method of using colloidal silver are preferred.

The silver halide photographic light-sensitive material of the present invention can be used for color negative film, color positive film, color reversal film color reversal printing paper, color printing paper and the like, but is preferably used as color printing paper.

The color printing paper preferably comprises at least one yellow color-forming silver halide emulsion layer, at least one magenta color-forming silver halide emulsion layer and at least one cyan color-forming silver halide emulsion layer. In general, these silver halide emulsion layers are provided in the order of, from the side nearer to the support, a yellow color-forming silver halide emulsion layer, a magenta color-forming silver halide emulsion layer and a cyan color-forming silver halide emulsion layer.

Of course, a layer structure different from the above may be employed.

The silver halide emulsion layer containing a yellow coupler may be disposed at any position on the support, however, when the yellow coupler-containing layer comprises silver halide tabular grains, the layer is preferably provided at the position more distant from the support than at least one layer of the magenta coupler-containing silver halide emulsion layer and the cyan coupler-containing silver halide emulsion layer. From the standpoint of accelerating the color development, promoting the desilvering and reducing the residual color due to sensitizing dyes, the yellow coupler-containing silver halide emulsion layer is preferably provided at the position remotest from the support than other silver halide emulsion layers. In view of the reduction in the bleach-fixing discoloration, the cyan coupler-containing silver halide emulsion is preferably provided as a mid layer of other silver halide emulsion layers and in view of the reduction in the light discoloration, the cyan coupler-containing silver halide emulsion layer is preferably provided as a lowermost layer. Each of the yellow, magenta and cyan color-forming layers may be composed of two or three layers. It is also preferred to provide a coupler layer containing no silver halide emulsion in adjacency to a silver halide emulsion layer to form a color-forming layer as described, for example, in JP-A-4-75055, JP-A-9-114035, JP-A-10-246940 and U.S. Pat. No. 5,576,159.

As for the silver halide emulsions, other materials (for example, additives) and photographic constituent layers (for example, layer arrangement), which can be used in the present invention, and the processing method and additives for the processing, which can be used for the processing of the light-sensitive material of the present invention, those described in JP-A-62-215272, JP-A-2-33144 and EP-A-0355660, particularly those described in EP-A-0355660, are preferred. In addition, the silver halide color photographic light-sensitive materials and the processing methods therefor described in JP-A-5-34889, JP-A-4-359249, JP-A-4-313753, JP-A-4-270344, JP-A-5-66527, JP-A-4-34548, JP-A-4-145433, JP-A-2-854, JP-A-1-158431, JP-A-2-90145, JP-A-3-194539, JP-A-2-93641 and EP-A-0520457 may also be preferably used.

Particularly, as for the reflection-type support, silver halide emulsion, foreign metal ion species which are doped in a silver halide grain, storage stabilizer and antifoggant for silver halide emulsion, chemical sensitization method (including sensitizer), spectral sensitization method (including spectral sensitizer), cyan, magenta and yellow couplers and emulsification-dispersion method therefor, dye image preservability improver (for example, staining inhibitor and discoloration inhibitor), dye (for colored layer), gelatin species, layer structure of light-sensitive material and coating pH of light-sensitive material, those described in patents shown in Tables 1 and 2 may be preferably applied to the present invention.

TABLES 1 AND 2

| Element | JP-A-7-104448 | JP-A-7-77775 | JP-A-7-301895 |
| --- | --- | --- | --- |
| Reflection-type support | column 7, line 12 to column 12, line 19 | column 35, line 43 to column 44, line 1 | column 5, line 40 to column 9, line 26 |
| Silver halide emulsion | column 72, line 29 to column 74, line 18 | column 44, line 36 to column 46, line 29 | column 77, line 48 to column 80, line 28 |
| Foreign metal ion species | column 74, lines 19 to 44 | column 46, line 30 to column 47, line 5 | column 80, line 29 to column 81, line 6 |
| Storage stabilizer and antifoggant | column 75, lines 9 to 18 | column 47, lines 20 to 29 | column 18, line 11 to column 31, line 37 |
| Chemical sensitization method (chemical sensitizer) | column 74, line 45 to column 75, line 6 | column 47, lines 7 to 17 | column 81, lines 9 to 17 |
| Spectral sensitization method (spectral sensitizer) | column 75, line 19 to column 76, line 45 | column 47, line 30 to column 49, line 6 | column 81, line 21 to column 82, line 48 |
| Cyan coupler | column 12, line 20 to column 39, line 49 | column 62, lines 50 to 16 | column 88, line 49 to column 89, line 16 |
| Yellow coupler | column 87, line 40 to column 88, line 3 | column 63, lines 17 to 30 | column 89, lines 17 to 30 |
| Magenta coupler | column 88, lines 4 to 18 | column 63, line 3 to column 64, line 11 | column 31, line 34 to column 77, line 44 and column 88, lines 32 to 46 |
| Emulsification-dispersion method of coupler | column 71, line 3 to column 72, line 11 | column 61, lines 36 to 49 | column 87, lines 35 to 48 |
| Dye image storability improver (staining inhibitor) | column 39, line 50 to column 70, line 9 | column 61, line 50 to column 62, line 49 | column 87, line 49 to column 88, line 48 |
| Discoloration inhibitor | column 70, line 10 to column 71, line 2 | | |
| Dye (colorant) | column 77, line 42 to column 78, line 41 | column 7, line 14 to column 19, line 42 and column 50, line 3 to column 51, line 14 | column 9, line 27 to column 18, line 10 |
| Gelatin species | column 78, lines 42 to 48 | column 51, lines 15 to 20 | column 83, lines 13 to 19 |
| Layer structure of light-sensitive material | column 39, lines 11 to 26 | column 44, lines 2 to 35 | column 31, line 38 to column 32, line 33 |
| Coating pH of light-sensitive material | column 72, lines 12 to 28 | | |
| Scan exposure | column 76, lines 6 to column 77, line 41 | column 49, line 7 to column 50, line 2 | column 82, line 49 to column 83, line 12 |
| Preservative in developer | column 88, line 19 to column 89, line 22 | | |

In addition, the couplers described in JP-A-62-215272, page 91, right upper column, line 4 to page 121, left upper column, line 6, JP-A-2-33144, page 3, right upper column, line 14 to page 18, left upper column, last line and page 30 right upper column, line 6 to page 35, right lower column, line 11, and EP-A-0355660, page 4, lines 15 to 27, page 5, line 30 to page 28, last line, page 45, lines 29 to 31, and page 47, line 23 to page 63, line 50 are also useful as the cyan, magenta and yellow couplers for use in the present invention.

Furthermore, the compounds represented by formulae (II) and (III) of WO-98/33760 and formula (D) of JP-A-10-221825 may also be preferably used in the present invention.

These are described in more detail below.

The cyan coupler which can be used in the present invention is preferably a pyrrolotriazole-base coupler and preferred examples thereof include the couplers represented by formulae (I) and (II) of JP-A-5-313324, the couplers represented by formula (I) of JP-A-6-347960 and the couplers described in these patents.

Also, phenol-base and naphthol-base cyan couplers may be preferably used and preferred examples thereof include the cyan couplers represented by formula (ADF) of JP-A-10-333297.

Other preferred examples of the cyan coupler include pyrroloazole-type cyan couplers described in European Patent 0488248 and EP-A-0491197, 2,5-diacylaminophenol couplers described in U.S. Pat. No. 5,888,716, pyrazoloazole-type cyan couplers having an electron-withdrawing group or a hydrogen bond group at the 6-position described in U.S. Pat. Nos. 4,873,183 and 4,916,051, and particularly pyrazoloazole-type cyan couplers having a carbamoyl group at the 6-position described in JP-A-8-171185, JP-A-8-311360 and JP-A-8-339060.

In addition, diphenylimidazole-base cyan couplers described in JP-A-2-33144, 3-hydroxypyridine-base cyan couplers described in EP-A-0333185 (in particular, a 2-equivalent coupler obtained by allowing Coupler (42) as a 4-equivalent coupler to have a chlorine-releasing group, and Couplers (6) and (9) described as specific examples are preferred), cyclic active methylene-base cyan couplers described in JP-A-64-32260 (in particular, Couplers 3, 8 and 34 described as specific examples are preferred), pyrrolopyrazole-type cyan couplers described in EP-A-0456226, and pyrroloimidazole-type cyan couplers described in European Patent 0484909 may also be used.

The magenta coupler for use in the present invention may be a 5-pyrazolone-base magenta coupler or a pyrazoloazole-base magenta coupler described in known publications shown in the Tables above. Among these, in view of hue, image stability and color formability, pyrazolotriazole couplers described in JP-A-61-65245, in which a secondary or tertiary alkyl group is directly bonded to the 2-, 3- or 6-position of a pyrazolotriazole ring; pyrazoloazole couplers containing a sulfonamide group within the molecule described in JP-A-61-65246; pyrazoloazole couplers having an alkoxyphenylsulfamide ballast group described in JP-A-61-147254; and pyrazoloazole couplers having an alkoxy group or an aryloxy group at the 6-position described in EP-A-226849 and EP-A-294785, are preferred.

In particular, the magenta coupler is preferably a pyrazoloazole coupler represented by formula (M-I) of JP-A-8-122984 and the contents in the paragraphs 0009 to 0026 of this patent can be applied to the present invention as it is and are incorporated as a part of the present specification.

In addition, pyrazoloazole couplers having a steric hindrance group at both the 3-position and the 6-position described in European Patents 854384 and 884640 may also be preferably used.

Examples of the yellow coupler which can be preferably used include, in addition to the compounds shown in the Tables above, acylacetamide-type yellow couplers having a 3- to 5-membered ring structure at an acyl group described in EP-A-0447969, malondianilide-type yellow coupler having a ring structure described in EP-A-0482552, and acylacetamide-type yellow couplers having a dioxane structure described in U.S. Pat. No. 5,118,599. Among these, preferred are acylacetamide-type yellow couplers where the acyl group is 1-alkylcyclopropane-1-carbonyl group, and malondianilide-type yellow couplers where one of the anilides forms an indoline ring. These couplers can be used individually or in combination of two or more thereof.

The coupler for use in the present invention is preferably emulsified and dispersed in an aqueous solution of hydrophilic colloid after impregnating the coupler in a loadable latex polymer (for example, the polymer described in U.S. Pat. No. 4,203,716) in the presence (or absence) of a high-boiling point organic solvent shown in the Tables above or after dissolving the dye together with a water-insoluble and organic solvent-soluble polymer.

Examples of the water-insoluble and organic solvent-soluble polymer which can be preferably used include homopolymers and copolymers described in U.S. Pat. No. 4,857,449, columns 7 to 15, and International Patent Publication WO88/00723, pages 12 to 30. In view of the dye image stability, methacrylate-base and acrylamide-base polymers are preferred, and acrylamide-base polymer is more preferred.

In the present invention, known color mixing inhibitors can be used and among these, the compounds described the following patents are preferred.

Examples of the color mixing inhibitor which can be used include high molecular weight redox compounds described in JP-A-333501, phenidone and hydrazine-based compounds described in WO98/33760 and U.S. Pat. No. 4,923,787, and white couplers described in JP-A-5-249637, JP-A-10-282615 and German Patent 19629142A1. In the case of elevating the pH of the developer and thereby performing rapid development, the redox compounds described in German Patent 19618786A1, EP-A-839623, EP-A-842975, German Patent 19806846A1 and French Patent 2760460A1 are preferred.

In the present invention, a compound containing a triazine skeleton having a high molar absorption coefficient is preferably used as an ultraviolet absorber and for example, the compounds described in the following patents can be used.

The compounds described in JP-A-46-3335, JP-A-55-152776, JP-A-5-197074, JP-A-5-232630, JP-A-5-307232, JP-A-6-211813, JP-A-8-53427, JP-A-8-234364, JP-A-8-239368, JP-A-9-31067, JP-A-10-115898, JP-A-10-147577, JP-A-10-182621, German Patent 19739797A, EP-A-711804 and Japanese Published Unexamined International Application 8-501291 can be used.

Although gelatin is advantageously used as the binder or protective colloid for use in the light-sensitive material of the present invention, other hydrophilic colloid can be used by itself or in combination with gelatin. In a preferred gelatin, the content of heavy metal impurities such as iron, copper, zinc and manganese is preferably 5 ppm or less, more preferably 3 ppm or less.

The amount of calcium contained in the light-sensitive material is preferably 20 $mg/m^2$ or less, more preferably 10 $mg/m^2$ or less, most preferably 5 $mg/m^2$ or less.

In the present invention, microbicide/antifungal described in JP-A-63-271247 is preferably added so as to prevent various molds and bacteria from proliferating in a hydrophilic colloid layer and thereby deteriorating the image.

The coating pH of the light-sensitive material is preferably from 4.0 to 7.0, more preferably from 4.0 to 6.5.

In the present invention, from the standpoint of improving the coating stability of the light-sensitive material, preventing the generation of electrostatic charge, controlling the electrostatic charge amount and the like, a surfactant may be added to the light-sensitive material. The surfactant includes an anionic surfactant, a cationic surfactant, a betaine surfactant and a nonionic surfactant and examples thereof include those described in JP-A-5-333492. The surfactant for use in the present invention is preferably a surfactant containing a fluorine atom, more preferably a fluorine atom-containing surfactant.

The amount of the surfactant added to the light-sensitive material is not particularly limited but is generally from $1\times10^{-5}$ to 1 $g/m^2$, preferably from $1\times10^{-4}$ to $1\times10^{-1}$ $g/m^2$, more preferably from $1\times10^{-3}$ to $1\times10^{-2}$ $g/m^2$.

The fluorine atom-containing surfactant may be used by itself or in combination with another conventionally known surfactant but is preferably used in combination with another conventionally known surfactant.

The light-sensitive material of the present invention is used for the printing system using a normal negative printer and additionally, is suitably used for the scan exposure system using a cathode ray tube (CRT). The CRT exposure apparatus is simple and compact as compared with apparatuses using a laser and therefore, costs low. Also, the control of optical axis and colors is facilitated.

The cathode ray tube used for the image exposure is a luminous element of various types, which emits light in a required spectral region. For example, a red luminous element, a green luminous element and a blue luminous element are used individually or in combination of two or more. The spectral region is not limited to these red, green and blue regions but a phosphor which emits light in the yellow, orange, ultraviolet or infrared region may also be used. In particular, a cathode ray tube using a mixture of these luminous elements to emit white light is often used.

In the case where the light-sensitive material has a plurality of light-sensitive layers different in the spectral sensitivity distribution and the cathode ray tube also has phosphors which emit light in a plurality of spectral regions, multiple colors may be exposed at a time, namely, the light may be emitted from the tube surface after image signals of multiple colors are input to the cathode ray tube. A method of sequentially inputting the image signals every each color, sequentially emitting light of respective colors, and performing the exposure through a film which cuts colors other than those colors (sequential exposure) may also be employed. In general, the sequential exposure is advantageous for attaining high image quality because a high resolution cathode ray tube can be used.

The light-sensitive material of the present invention is preferably used for digital scanning exposure system using monochromatic high-density light such as gas laser, light-emitting diode, semiconductor laser or second harmonic generating light source (SHG) comprising a combination of a nonlinear optical crystal with a semiconductor laser or a solid state laser using a semiconductor laser as an excitation light source. In order to make the system compact and inexpensive, a semiconductor laser or a second harmonic generating light source (SHG) comprising a combination of a nonlinear optical crystal with a semiconductor laser or a solid state laser is preferably used. Particularly, in order to design a compact and inexpensive apparatus having a long life and high stability, a semiconductor laser is preferably used and at least one of exposure light sources is preferably a semiconductor laser.

In the case of using this scanning exposure light source, the spectral sensitivity maximum wavelength of the light-sensitive material of the present invention can be freely set according to the wavelength of the scanning exposure light source used. In the case of an SHG light source obtained by combining a nonlinear optical crystal with a semiconductor laser or a solid state laser using a semiconductor laser as an excitation light source, the oscillation wavelength of the laser can be halved and therefore, blue light and green light are obtained. As a result, the light-sensitive material can have a spectral sensitivity maximum in normal three wavelength regions of blue, green and red.

The exposure time in this scanning exposure is defined as the time for exposing a picture element size with a picture element density of 400 dpi and the exposure time is preferably $10^{-4}$ sec or less, more preferably $10^{-6}$ sec or less.

The preferred scanning exposure system which can be applied to the present invention is described in detail in the patents set forth in the Tables above.

In processing the light-sensitive material of the present invention, the processing materials and processing methods described in JP-A-2-207250, page 26, right lower column, line 1 to page 34, right upper column, line 9, and in JP-A-4-97355, page 5, left upper column, line 17 to page 18, right lower column, line 20, may be preferably applied. For the preservative used in this developer, the compounds described in the patents shown in the Tables above may be preferably used.

The present invention is preferably applied also to a light-sensitive material having suitability for rapid processing.

The color development time means a time period from a light-sensitive material enters in a color developer until it enters in a bleach-fixing solution in the subsequent processing step. For example, in the case of processing in an automatic developing machine, the sum total of two time periods, namely, the time period where the light-sensitive material is immersed in a color developer (so-called in-liquid time) and the time period where the light-sensitive material is departed from the color developer and transferred in air toward the bleach-fixing bath in the subsequent step (so-called in-air time), is called a color development time. In the same way, the bleach-fixing time means the time period from the light-sensitive material enters in a bleach-fixing solution until it enters in the subsequent water washing or stabilizing bath. Also, the water washing or stabilization time means a time period where the light-sensitive material enters in the water washing or stabilizing solution and stays in the liquid (so-called in-liquid time) in preparation for the drying step.

In the present invention, when a rapid processing is performed, the color development time is preferably 15 seconds or less, more preferably from 6 to 12 seconds. Similarly, the bleach-fixing time is preferably 15 seconds or less, more preferably from 6 to 12 seconds. The water washing or stabilization time is preferably 50 seconds or less, more preferably from 6 to 25 seconds.

After the exposure, the light-sensitive material of the present invention may be developed by a wet system, for example, a conventional development method using a developer containing an alkali agent and a developing agent is used or a development method where a developing agent is incorporated into the light-sensitive material and the development is performed using an activator solution such as alkali solution containing no developing agent, or may also be developed by a heat development system using no processing solution. Particularly, the activator method uses a processing solution not containing a developing agent and therefore, the processing solution is facilitated in the control and handling. Furthermore, the load at the treatment of waste solution is reduced and this is preferred also in view of environmental conservation.

In the activator method, the developing agent or a precursor thereof incorporated into the light-sensitive material is preferably a hydrazine-type compound described, for example, in JP-A-8-234388, JP-A-9-152686, JP-A-9-152693, JP-A-9-211814 AND JP-A-9-160193.

Furthermore, a development method where the coated silver amount of the light-sensitive material is reduced and a treatment for intensifying the image (intensification treatment) using hydrogen peroxide is performed, is also preferably used. Particularly, use of this method for the activator method is advantageous. More specifically, an image formation method using an activator solution containing hydrogen peroxide is preferred and this is described in JP-A-8-297354 and JP-A-9-152695.

In the activator method, desilvering generally follows the processing with an activator solution, however, in the method including the image intensification treatment and using a light-sensitive material having a low silver amount, the desilvering can be omitted and a simple and easy process such as water washing or stabilization may be performed. In the case of a system of reading image information from a light-sensitive material using a scanner or the like, a processing form capable of dispensing with desilvering can be employed even when a light-sensitive material having a high silver amount, such as a light-sensitive material for photographing, is used.

For the processing with the activator solution, the desilvering solution (bleach/fixing solution) and the washing and stabilizing solution, known processing materials and known processing methods may be used. Preferred examples thereof include those described in *Research Disclosure*, Item 36544 (September 1994), pages 536 to 541, and JP-A-8-234388.

In exposing the light-sensitive material of the present invention in a printer, a band stop filter described in U.S. Pat. No. 4,880,726 is preferably used, whereby light color mixing can be removed and color reproducibility can be greatly improved.

In the present invention, copy restriction may be applied by pre-exposing a yellow microdot pattern in advance of imparting the image information as described in EP-A-0789270 and EP-A-0789480.

The present invention is described in greater detail below by referring to the Examples.

EXAMPLE 1

(Preparation of Cubic Emulsion A)

In a 5% aqueous solution of lime-processed gelatin, 5.6 g of sodium chloride was added and thereto 42.8 ml of 1N sulfuric acid and 1.1 ml of N,N'-dimethylimidazolidine-2-thione (1% aqueous solution) were added. To the resulting aqueous solution, an aqueous solution containing 0.21 mol of silver nitrate and an aqueous solution containing 0.21 mol of sodium chloride were added and mixed at 61° C. with stirring (first addition). Subsequently, while keeping the temperature at 61° C., an aqueous solution containing 1.27 mol of silver nitrate and an aqueous solution containing 1.27 mol of sodium chloride were added and mixed with stirring (second addition). Furthermore, an aqueous solution containing 0.21 mol of silver nitrate and an aqueous solution containing 0.21 mol of sodium chloride were added and mixed with stirring (third addition). Subsequently, an aqueous solution containing 0.21 mol of silver nitrate and an aqueous solution containing 0.21 mol of sodium chloride were added and mixed with stirring (fourth addition). Furthermore, while keeping the temperature at 61° C., an aqueous solution containing 0.02 mol of silver nitrate and an aqueous solution containing 0.02 mol of sodium chloride were added and mixed with vigorous stirring (fifth addition). Subsequently, an aqueous solution containing 0.11 mol of silver nitrate and an aqueous solution containing 0.11 mol of sodium chloride were added and mixed with stirring (sixth addition). Then, an aqueous solution containing 0.04 mol of silver nitrate and an aqueous solution containing 0.04 mol of sodium chloride were added and mixed with stirring (seventh addition. Finally, an aqueous solution containing 0.04 mol of silver nitrate and an aqueous solution containing 0.04 mol of sodium chloride were added and mixed at 61° C. with stirring (eighth addition).

The resulting emulsion was desalted through precipitation and water washing at 40° C. and then, the pH and the pAg of the emulsion were adjusted to 7.3 and 5.6, respectively, by adding 168.0 g of lime-processed gelatin. From an electron microphotograph, the grain shape was cubic, the grain size was 0.62 μm and the coefficient of variation in the grain size was 10%.

(Preparation of Cubic Emulsion B Containing Iodide and Hexacyano Complex)

Emulsion B was prepared in the same manner as Emulsion A except that these emulsions were different in the following points.

The halogen solution in the second addition contained 1.27 mol of sodium chloride and a transition metal complex of $K_2[Ru(NO)Cl_5]$ in an amount of giving a coverage of $1 \times 10^{-8}$ mol/mol-Ag at the completion of grain formation.

The halogen solution in the fourth addition contained 0.21 mol of sodium chloride and a transition metal complex of $K_4[Ru(CN)_6]$ in an amount of giving a coverage of $2 \times 10^{-5}$ mol/mol-Ag at the completion of grain formation.

The halogen solution in the fifth addition contained 0.02 mol of sodium chloride and 0.005 mol of potassium iodide.

The halogen solution in the sixth addition contained 0.11 mol of sodium chloride and a transition metal complex of $K_2[Ir(H_2O)Cl_5]$ in an amount of giving a coverage of $2 \times 10^{-8}$ mol/mol-Ag at the completion of grain formation.

The halogen solution in the seventh addition contained 0.04 mol of sodium chloride and a transition metal complex of $K_2[IrCl_6]$ in an amount of giving a coverage of $4 \times 10^{-8}$ mol/mol-Ag at the completion of grain formation.

From the electron microphotograph, the shape of obtained grains was cubic, the grain size was 0.62 μm and the coefficient of variation in the grain size was 10%.

(Chemical Sensitization and Spectral Sensitization)

To each of Emulsions A and B, a gold sensitizer (bis(1, 4,5-trimethyl-1,2,4-triazolium-3-thiolate) Au(I) tetrafluoroborate), a sulfur sensitizer (sodium thiosulfate) and $3.8 \times 10^{-4}$ mol/mol-Ag of a spectral sensitizing dye shown in Table 3 were added to optimally perform the chemical sensitization and spectral sensitization at 60° C. Furthermore, $4.4 \times 10^{-4}$ mol/mol-Ag of 1-(5-methylureidophenyl)-5-mercaptotetrazole was added.

Sensitizing Dye A

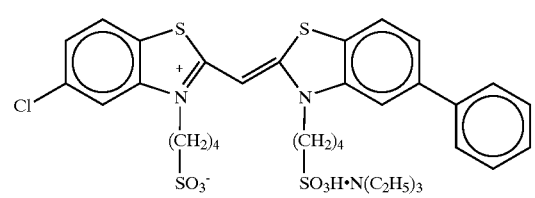

Sensitizing Dye B

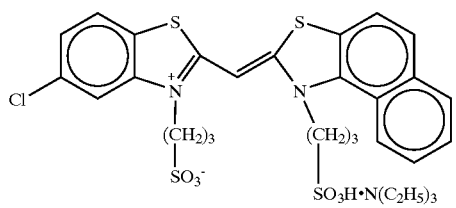

(Preparation of Coated Sample)

On the surface of a support obtained by coating both surfaces of paper with polyethylene resin, a corona discharge treatment was applied. Thereafter, a gelatin undercoat layer containing sodium dodecylbenzenesulfonate was provided and furthermore, the fist to seventh photographic constituent layers were provided in sequence to prepare silver halide color photographic light-sensitive material Samples (T101) to (T112) having the following layer structure. The costing solution for each photographic constituent layer was prepared as follows.

Preparation of Coating Solution

Couplers, Dye image stabilizers and ultraviolet absorbers were dissolved in a solvent and ethyl acetate, the obtained solution was emulsification-dispersed in an aqueous 10 wt % gelatin solution containing a surfactant by means of a high-speed stirring emulsifier (dissolver), and water was added thereto to prepare an emulsified dispersion.

The thus-obtained emulsified dispersion and a high chloride emulsion were mixed and dissolved to prepare a coating solution having a composition shown later.

In each layer, 1-oxy-3,5-dichloro-s-triazine sodium salt was used as a gelatin hardening agent. Furthermore, in each layer, Ab-1, Ab-2 and Ab-3 shown below were added to give a total amount of 15.0 mg/m$^2$, 60.0 mg/m$^2$ and 5.0 mg/m$^2$, respectively.

Antiseptic (Ab-1)

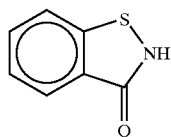

Antiseptic (Ab-2)

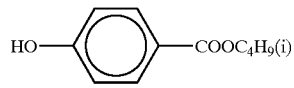

Antiseptic (Ab-3)

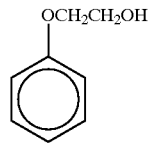

The high silver chloride emulsion used in each light-sensitive emulsion layer was as follows.

Blue-sensitive Emulsion Layer

An emulsion shown in Table 3 was used.

Green-sensitive Emulsion Layer

Sensitizing Dye C was added to a silver chlorobromide emulsion (cubic; a 1:3 (by mol of silver) mixture of a large-size emulsion having an average grain size of 0.45 μm and a small-size emulsion having an average grain size of 0.35 μm, with the coefficient of variation in the grain size being 10% and 8%, respectively; the emulsion of each size containing 0.4 mol % of silver bromide localized on a part of the surface of a grain comprising a silver chloride substrate) in an amount of $3.0 \times 10^{-4}$ mol for the large-size emulsion and in an amount of $3.6 \times 10^{-4}$ mol for the small-size emulsion, per mol of silver halide. Furthermore, Sensitizing Dye D was added in an amount of $4.0 \times 10^{-5}$ mol for the large-size emulsion and in an amount of $2.8 \times 10^{-4}$ mol for the small-size emulsion, per mol of silver halide.

(Sensitizing Dye C)

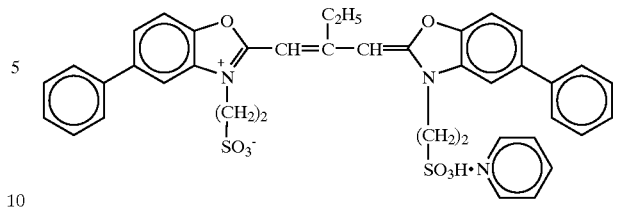

(Sensitizing Dye D)

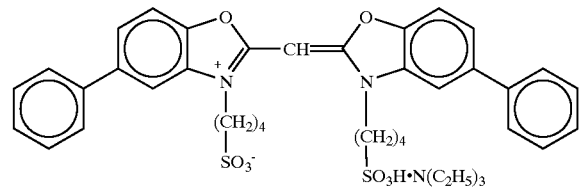

Red-sensitive Emulsion Layer

Sensitizing Dyes E and F were added to a silver chlorobromide emulsion (cubic; a 1:4 (by mol of silver) mixture of Large-Size Emulsion A having an average grain size of 0.50 μm and Small-Size Emulsion B having an average grain size of 0.41 μm, with the coefficient of variation in the grain size being 0.09 and 0.11, respectively; the emulsion of each size containing 0.8 mol % of silver bromide localized on a part of the surface of a grain comprising a silver chloride substrate) each in an amount of $6.0 \times 10^{-5}$ mol for the large-size emulsion and each in an amount of $9.0 \times 10^{-5}$ mol for the small-size emulsion, per mol of silver halide.

(Sensitizing Dye E)

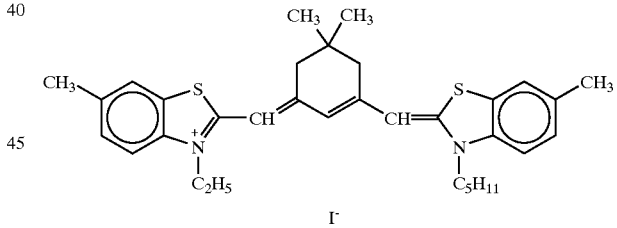

(Sensitizing Dye F)

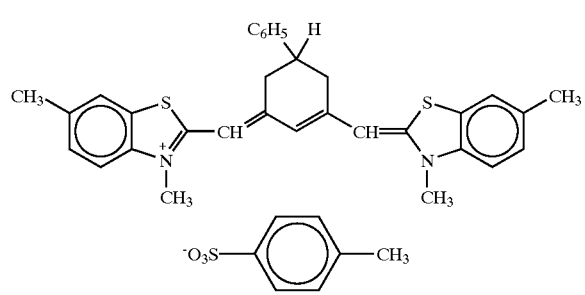

Furthermore, Compound I shown below was added in an amount of $2.6 \times 10^{-3}$ mol per mol of silver halide.

(Compound I)

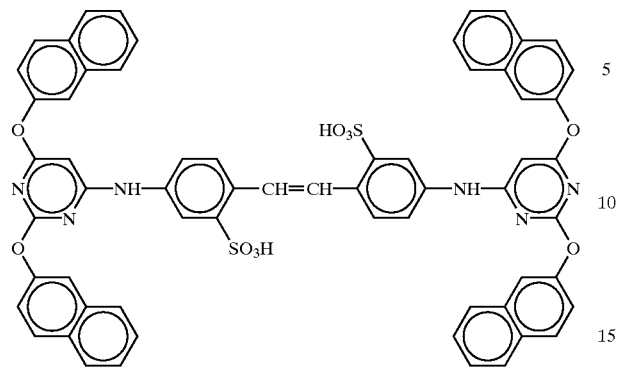

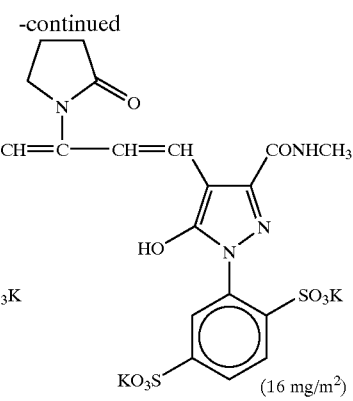
(16 mg/m$^2$)

To the blue-sensitive, green-sensitive and red-sensitive emulsion layers, 1-(3-methylureidophenyl)-5-mercaptotetrazole was added in an amount of $3.3 \times 10^{-4}$ mol, $1.0 \times 10^{-3}$ mol and $5.9 \times 10^{-4}$ mol, respectively, per mol of silver halide.

To the second, fourth, sixth and seventh layers, the same compound was added to have a coverage of 0.2 mg/m$^2$, 0.2 mg/m$^2$, 0.6 mg/m$^2$ and 0.1 mg/m$^2$, respectively.

Furthermore, to the red-sensitive emulsion layer, 0.05 g/m$^2$ of a methacrylic acid/butyl acrylate copolymer (weight ratio: 1:1, average molecular weight: 200,000 to 400,000) was added. Also, to the second, fourth and sixth layers, disodium catechol-3,5-disulfonate was added to have a coverage of 6 mg/m$^2$, 6 mg/m$^2$ and 18 mg/m$^2$, respectively.

For the purpose of preventing irradiation, the following dyes (in the parenthesis, the coated amount is shown) were added to the emulsion layers.

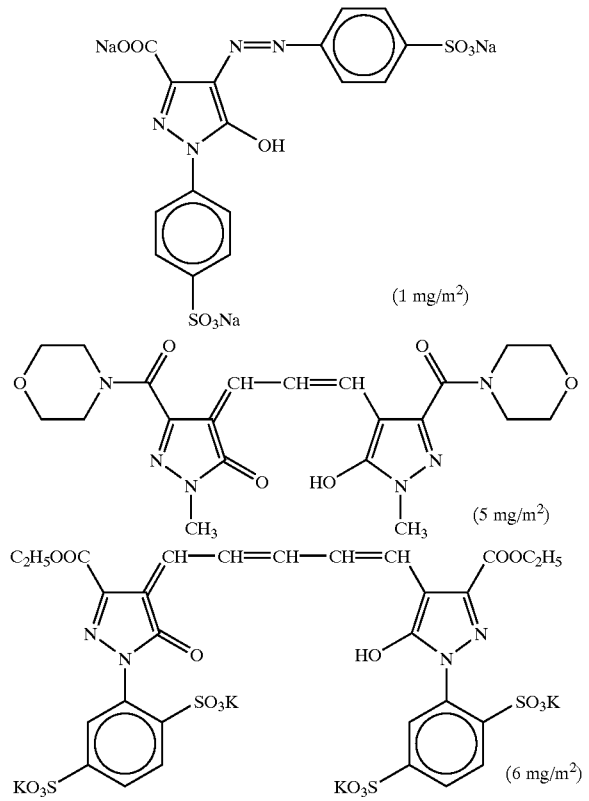

(Layer Structure)

The layer structure is shown below. The numeral shows the coated amount (g/m$^2$). In the case of silver halide emulsions, the coated amount is a coated amount in terms of silver.

Support

Polyethylene resin laminated paper [polyethylene resin in the first layer side contained white pigments (TiO$_2$ to a content of 16 wt % and ZnO to a content of 4 wt %), 13 mg/m$^2$ of a fluorescent whitening agent (i.e., a brightening agent) (4,4'-bis(5-methylbenzoxazolyl)stilbene) and 96 mg/m$^2$ of a bluish dye (ultramarine)]

First Layer (Blue-sensitive Emulsion Layer)

| | |
|---|---|
| Emulsion | 0.24 |
| Gelatin | 1.25 |
| Yellow Coupler (ExY) | 0.57 |
| Dye Image Stabilizer (Cpd-1) | 0.07 |
| Dye Image Stabilizer (Cpd-2) | 0.04 |
| Dye Image Stabilizer (Cpd-3) | 0.07 |
| Dye Image Stabilizer (Cpd-4) | 0.02 |
| Solvent (Solv-1) | 0.21 |

Second Layer (Color Mixing Inhibiting Layer)

| | |
|---|---|
| Gelatin | 0.60 |
| Color Mixing Inhibitor (Mid-1) | 0.10 |
| Color Mixing Inhibitor (Mid-2) | 0.18 |
| Color Mixing Inhibitor (Mid-3) | 0.02 |
| Ultraviolet Absorber (UV-C) | 0.05 |
| Solvent (Solv-5) | 0.11 |

Third Layer (Green-sensitive Emulsion Layer)

| | |
|---|---|
| Emulsion | 0.14 |
| Gelatin | 0.73 |
| Magenta Coupler (ExM) | 0.15 |
| Ultraviolet absorber (UV-A) | 0.05 |
| Dye Image Stabilizer (Cpd-2) | 0.02 |
| Color Mixing Inhibitor (Cpd-7) | 0.008 |
| Dye Image Stabilizer (Cpd-4) | 0.08 |
| Dye Image Stabilizer (Cpd-5) | 0.02 |
| Dye Image Stabilizer (Cpd-6) | 0.009 |
| Dye Image Stabilizer (Cpd-7) | 0.0001 |
| Solvent (Solv-3) | 0.06 |
| Solvent (Solv-4) | 0.11 |
| Solvent (Solv-5) | 0.06 |

Fourth Layer (Color Mixing Inhibiting Layer)

| | |
|---|---|
| Gelatin | 0.48 |
| Color Mixing Inhibitor (Mid-4) | 0.07 |
| Color Mixing Inhibitor (Mid-2) | 0.006 |
| Color Mixing Inhibitor (Mid-3) | 0.006 |
| Ultraviolet absorber (UV-C) | 0.04 |
| Solvent (Solv-5) | 0.09 |

Fifth Layer (Red-sensitive Emulsion Layer)

| | |
|---|---|
| Emulsion | 0.12 |
| Gelatin | 0.59 |
| Cyan Coupler (ExC-1) | 0.13 |
| Cyan Coupler (ExC-2) | 0.03 |
| Color Mixing Inhibitor (Mid-3) | 0.01 |
| Dye Image Stabilizer (Cpd-5) | 0.04 |
| Dye Image Stabilizer (Cpd-8) | 0.19 |
| Dye Image Stabilizer (Cpd-9) | 0.04 |
| Solvent (Solv-5) | 0.09 |

Sixth Layer (Ultraviolet Absorbing Layer)

| | |
|---|---|
| Gelatin | 0.32 |
| Ultraviolet Absorber (UV-C) | 0.42 |
| Solvent (Solv-7) | 0.08 |

Seventh Layer (Protective Layer)

| | |
|---|---|
| Gelatin | 0.70 |
| Acryl-modified polymer of polyvinyl alcohol (modification degree: 17%) | 0.04 |
| Liquid paraffin | 0.01 |
| Surfactant (Cpd-13) | 0.01 |
| Polydimethylsiloxane | 0.01 |
| Silicon dioxide | 0.003 |

Yellow Coupler (ExY)

A 70:30 (by mol) mixture of:

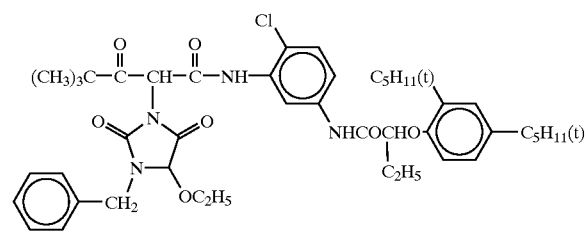

and

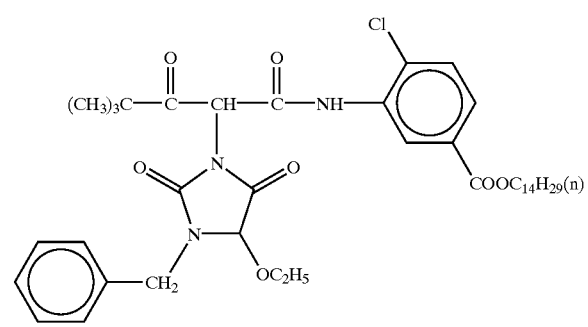

Magenta Coupler (ExM)

A 40:40:20 (by mol) mixture of

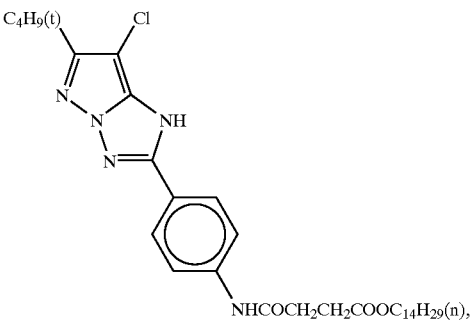

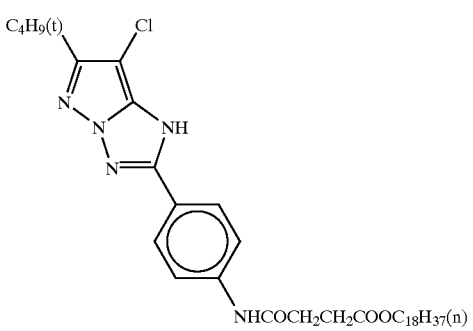

and

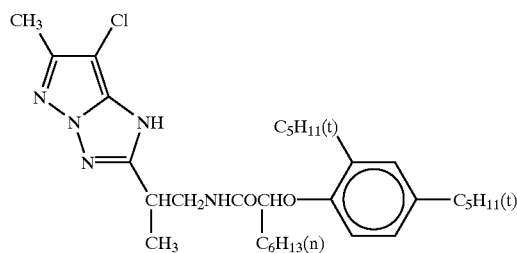

Cyan Coupler (ExC-1)

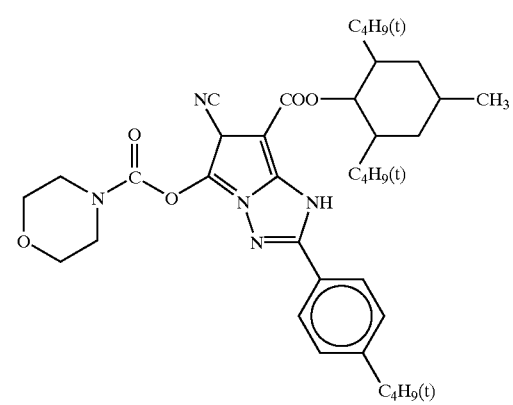

Cyan Coupler (ExC-2)
A 50:25:25 (by mol) mixture of
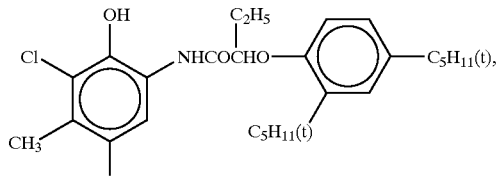
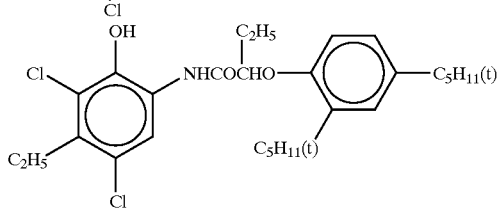
and
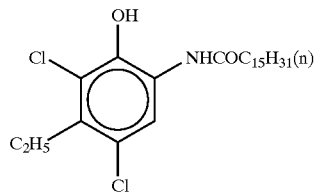
Dye Image Stabilizer (Cpd-1)
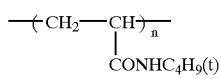
Number average molecular weight: 60,000
Dye Image Stabilizer (Cpd-2)
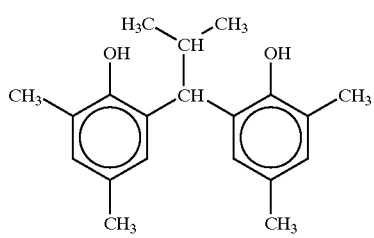
Dye Image Stabilizer (Cpd-3)
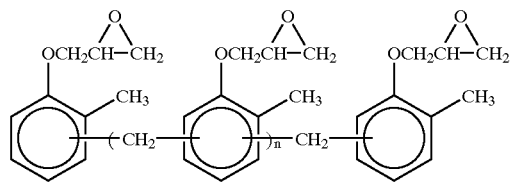
n: 7 to 8 (average)
Dye Image Stabilizer (Cpd-4)
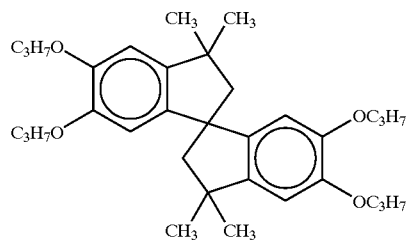
Dye Image Stabilizer (Cpd-5)
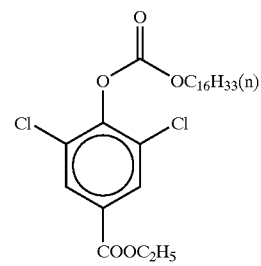
Dye Image Stabilizer (Cpd-6)
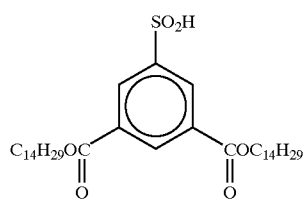
Dye Image Stabilizer (Cpd-7)
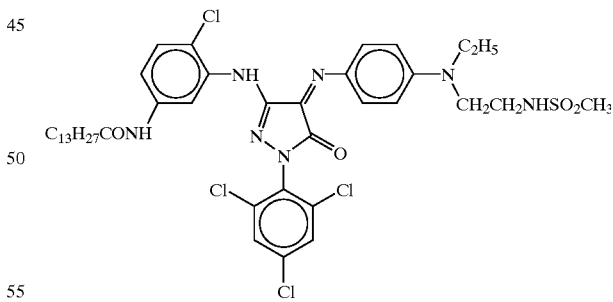
Dye Image Stabilizer (Cpd-8)
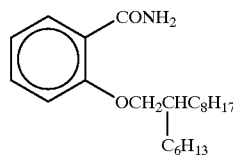

Dye Image Stabilizer (Cpd-9)
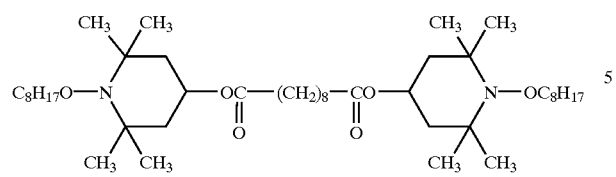
Color Mixing Inhibitor (Mid-1)
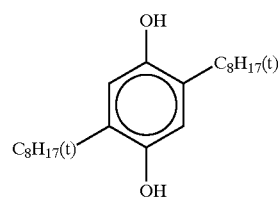
Color Mixing Inhibitor (Mid-2)
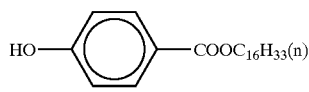
Color Mixing Inhibitor (Mid-3)
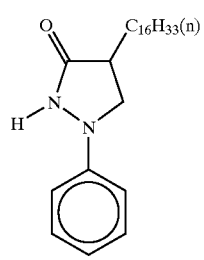
Color Mixing Inhibitor (Mid-4)
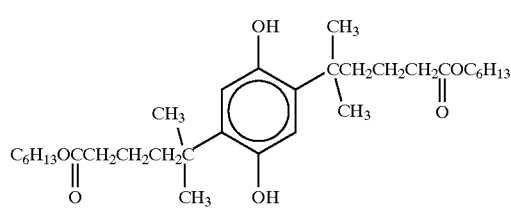
 (Solv-1)
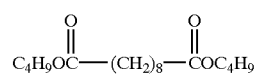 (Solv-3)
$O=P-(OC_6H_{13}(n))_3$ (Solv-4)
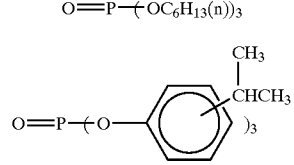 (Solv-5)
-continued
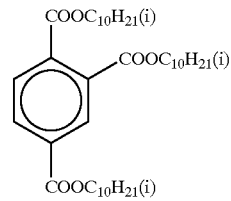 (Solv-7)
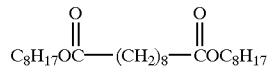 (Solv-8)
Ultraviolet Absorber (UV-1)
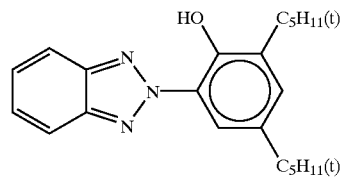
Ultraviolet Absorber (UV-2)
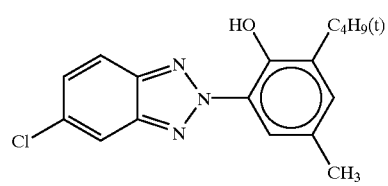
Ultraviolet Absorber (UV-3)
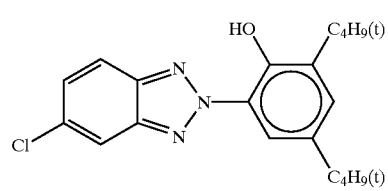
Ultraviolet Absorber (UV-4)
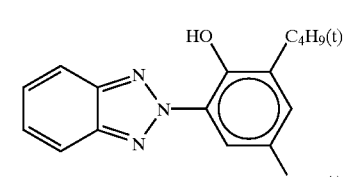
Ultraviolet Absorber (UV-6)
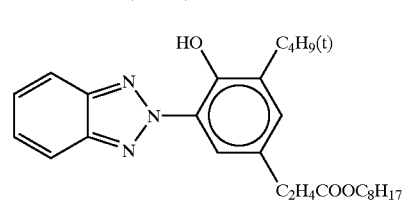

Ultraviolet Absorber (UV-7)

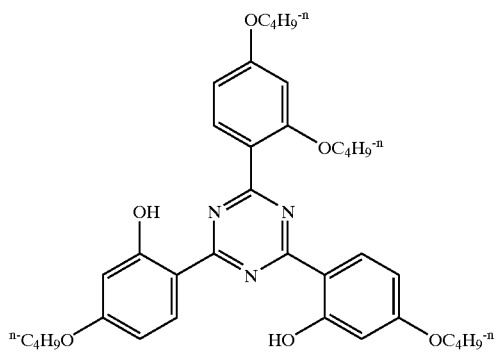

(UV-A)
A 4/2/2/3 (by weight) mixture of UV-1/UV-2/UV-3/UV-4
(UV-C)
A 1/1/1/2 (by weight) mixture of UV-2/UV-3/UV-6/UV-7
Surface Active Agent (Cpd-13)
A 7:3 (by mol) mixture of

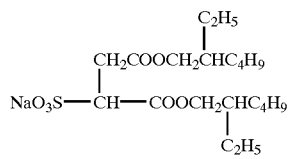

and

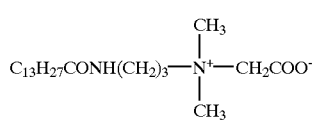

As such, coated Samples T101 to T112 were prepared.
(Pressure Fogging Test)
On each sample, a needle having a diameter of 0.1 mm under a load of 10 g was moved at a speed of 600 mm/min (pressure treatment). Using a sample developed without passing through exposure, the difference in the density (called "pressure fogging") between the portion subjected to the pressure treatment and the portion not subjected to the pressure treatment was measured by means of a microdensitometer having an aperture size of 10 $\mu$m.
(Exposure)
Using the following exposure apparatus, each sample was exposed to the gradation of three color separation by means of three color laser rays of B, G and R. At this time, the laser output was corrected to obtain optimum improvements in each sample.
(Exposure Apparatus)
The light sources used were a YAG solid laser (oscillation wavelength: 946 nm) using a semiconductor laser GaAlAs (oscillation wavelength: 808.5 nm) as the excitation light source and being subjected to the wavelength conversion using SHG crystal of $LiNbO_3$ having an inverted domain structure to take out 473 nm, a $YVO_4$ solid laser (oscillation wavelength: 1,064 nm) using a semiconductor laser GaAlAs (oscillation wavelength: 808.5 nm) as the excitation light source and being subjected to the wavelength conversion using SHG crystal of $LiNbO_3$ having an inverted domain structure to take out 532 nm, and an AlGaInP laser (oscillation wavelength: 680 nm; Type No. LN9R20, manufactured by Matsushita Electric Industrial Co., Ltd.). Respective laser rays of three colors were modulated in the intensity by AOM and moved in the direction perpendicular to the scanning direction using a polygon mirror so as to sequentially scan and thereby expose a color photographic paper. For preventing the semiconductor laser from fluctuating in the quantity of light due to temperature, the temperature was kept constant by utilizing a Peltier element. The scanning exposure was 600 dpi and by the measurement using a light beam diameter measurement apparatus [1180GP, manufactured by Beam Scan Inc. (USA)], the B, G and R all were found to have a beam diameter of 65 $\mu$m (a circular beam with the difference between the diameter in the main scanning direction and the diameter in the sub-scanning direction being within 1%).
(Development Processing; Dry-to-dry Time of 70 seconds)
Each sample was subjected to color development processing using the processing solutions shown below through the following processing steps, however, exposure was not performed.

| Processing Step | Temperature (° C.) | Time (sec) | Replenisher* (ml) | Tank Volume (liter) |
|---|---|---|---|---|
| Color development | 45 | 15 | 35 | 2 |
| Bleach-fixing | 40 | 15 | 38 | 1 |
| Rinsing (1) | 40 | 10 | — | 1 |
| Rinsing (2) | 40 | 10 | — | 1 |
| Rinsing (3) | 40 | 10 | 90 | 1 |
| Drying | 80 | 10 | — | — |

(A tank countercurrent system of Rinsing (3) → (1))
*Replenishing amount per 1 $m^2$ of light-sensitive material.

In the above-described processing, the water of Rinsing (3) was sent by a pump to a reverse osmosis membrane. The penetrated water was fed to rinsing (3) and the concentrated water not passed through the reverse osmosis membrane was fed back to rinsing (2) and used there. For saving the crossover time, a blade was disposed between respective rinsing tanks and the sample was passed therethrough. In each step, a circulating processing solution was sprayed using a spraying apparatus described in JP-A-8-314088 by setting the amount sprayed to 4 to 6 liters/minute per one tank.

Each processing solution had the following composition.

| Color Developer: | Tank Solution | Replenisher |
|---|---|---|
| Water | 700 ml | 700 ml |
| Sodium triisopropyl-naphathalene (β) sulfonate | 0.1 g | 0.1 g |
| Ethylenediaminetetraacetic acid | 3.0 g | 3.0 g |
| Disodium 1,2-dihydroxy-benzene-4,6-disulfonate | 0.5 g | 0.5 g |
| Triethanolamine | 12.0 g | 12.0 gl |
| Potassium chloride | 15.8 g | — |
| Potassium bromide | 0.04 g | — |
| Potassium carbonate | 27.0 g | 27.0 g |
| Sodium sulfite | 0.1 g | 0.1 g |
| Disodium N,N-bis(sulfonato-ethyl)hydroxylamine | 18.0 g | 18.0 g |
| N-Ethyl-N-(β-methanesulfon-amidoethyl)-3-methyl-4-aminoaniline sulfate | 8.0 g | 23.0 g |

-continued

| Color Developer: | Tank Solution | Replenisher |
|---|---|---|
| Sodium bis(2,4-disulfonato-ethyl-1,3,5-triazyl-6)-diaminostilbene-2,2-disulfonate | 5.0 g | 6.0 g |
| Water to make | 1,000 ml | 1,000 ml |
| pH (at 25° C.) | 10.35 | 12.80 |

The bleach-fixing solution was prepared by mixing the following two-component replenishers as follows.

| Bleach-Fixing Solution | Tank Solution | Replenisher (38 ml/m² in total of the amounts shown below) |
|---|---|---|
| First replenisher | 260 ml | 18 ml |
| Second replenisher | 290 ml | 20 ml |
| Water to make | 1,000 ml | |
| pH (at 25° C.) | 5.0 | |

The first and second replenishers each had the following composition.

First Replenisher

| Water | 150 ml |
|---|---|
| Ethylenebisguanidine nitrate | 30 g |
| Ammonium sulfite monohydrate | 226 g |
| Ethylenediaminetetraacetic acid | 7.5 g |
| Triazinylaminostilbene-base fluorescent brightening agent (Hakkol FWA-SF, produced by Showa Kagaku K.K.) | 1.0 g |
| Ammonium bromide | 30 g |
| Ammonium thiosulfate (700 g/liter) | 340 ml |
| Water to make | 1,000 ml |
| pH (at 25° C.) | 5.82 |

Second Replenisher

| Water | 140 ml |
|---|---|
| Ethylenediaminetetraacetic acid | 11.0 g |
| Ammonium ethylenediaminetetraacetato-ferrate (III) | 384 g |
| Acetic acid (50%) | 230 ml |
| Water to make | 1,000 ml |
| pH (at 25° C.) | 3.35 |

Rinsing Solution

Ion exchange water (with calcium and magnesium ion concentrations each being 3 ppm or less)

The color formed samples after the completion of processing each was measured on the reflection density using a TCD type density measuring apparatus manufactured by Fuji Photo Film Co., Ltd. The sensitivity is determined from the exposure amount necessary for giving a color density 1.0 higher than the fogging density. The blue sensitivity was shown by a relative value assuming that the sensitivity of Sample 101 subjected to 180-second processing was 100. The measurements results are shown together with the results in the pressure fogging test in Table 3.

TABLE 3

Results of Blue Sensitivity, Fogging and Pressure Fogging

| Coated Sample | | 180-Second Processing | | | 70-Second Processing | | | |
|---|---|---|---|---|---|---|---|---|
| No. (Emulsion No.) | Sensitizing Dye | Blue Sensitivity | Fogging | Pressure Fogging | Blue Sensitivity | Fogging | Pressure Fogging | Remarks |
| T101 (A) | A | 100 | 0.03 | 0.102 | 110 | 0.04 | 0.133 | Comparison |
| T102 (A) | B | 105 | 0.03 | 0.113 | 115 | 0.05 | 0.145 | Comparison |
| T103 (A) | I-12 | 120 | 0.02 | 0.080 | 125 | 0.03 | 0.125 | Comparison |
| T104 (A) | I-13 | 115 | 0.02 | 0.075 | 120 | 0.03 | 0.115 | Comparison |
| T105 (A) | I-14 | 118 | 0.03 | 0.0098 | 131 | 0.04 | 0.130 | Comparison |
| T106 (A) | I-15 | 122 | 0.03 | 0.096 | 138 | 0.03 | 0.128 | Comparison |
| T107 (B) | A | 215 | 0.05 | 0.142 | 225 | 0.06 | 0.188 | Comparison |
| T108 (B) | B | 225 | 0.05 | 0.150 | 230 | 0.06 | 0.192 | Comparison |
| T109 (B) | I-12 | 238 | 0.03 | 0.120 | 241 | 0.04 | 0.144 | Invention |
| T110 (B) | I-13 | 230 | 0.03 | 0.115 | 242 | 0.04 | 0.145 | Invention |
| T111 (B) | I-14 | 240 | 0.03 | 0.120 | 250 | 0.03 | 0.140 | Invention |

It is seen from the results in Table 3 that the emulsions according to the present invention succeeded in achieving high sensitivity by virtue of the introduction of iodide and hexacyano complex, nevertheless, were reduced in the fogging. In particular, the increase in fog density generated on performing a rapid processing was small and a low fog density was ensured. The emulsions of the present invention showed the same tendency also for the pressure fogging. That is, high sensitivity was achieved by the introduction of iodide and hexacyano complex and at the same time, the pressure fogging was low. In particular, the increase in pressure fog density generated on performing a rapid processing was very small.

EXAMPLE 2

(Preparation of Emulsion C Containing {100} Tabular Grains)

In a reactor, 1,200 ml of $H_2O$, 25 g of gelatin (deionized alkali-treated gelatin having a methionine content of about 40 $\mu$mol/g), 0.4 g of sodium chloride and 4.5 ml of a nitric acid 1N solution (having a pH of 4.5) were charged and the temperature was kept at 40° C. Then, Solution Ag-1 (silver nitrate: 0.2 g/ml) and Solution X-1 (sodium chloride: 0.069 g/ml) were added and mixed at 48 ml/min over 4 minutes while vigorously stirring. After 15 seconds, 150 ml of an aqueous polyvinyl alcohol solution [average polymerization degree of vinyl acetate: 1,700, containing 6.7 g of polyvinyl alcohol having an average saponification ratio to alcohol of 98% or more (hereinafter referred to as "PVA-1"), in 1 liter of $H_2O$]was added.

Furthermore, 12.3 ml of a nitric acid 1N solution was added to adjust the pH to 3.5. The temperature was elevated to 75° C. over 15 minutes, 23 ml of a sodium hydroxide 1N solution was added to adjust the pH to 6.5, and 4.0 ml of 1-(5-methylureidophenyl)-5-mercaptotetrazole (0.05%) and 4.0 ml of N,N'-dimethylimidazolidine-2-thione (1% aqueous solution) were added. Thereafter, 4 g of sodium chloride was added, the silver potential (to saturated calomel electrode at room temperature) was adjusted to 100 mV and then, as a growing process, Solution Ag-1 and Solution X-2 (containing 0.069 g/ml of sodium chloride and $3\times10^{-10}$ mol/ml of $K[IrCl_5(H_2O)]$) were simultaneously added for 17 minutes while linearly increasing the flow rate from 40 ml/min to 42 ml/min and while keeping the silver potential at 100 mV. Thereafter, 12.5 ml of a nitric acid 1N solution was added to adjust the pH to 4.0. Furthermore, 28.8 g of sodium chloride was added, the silver potential was adjusted to 60 mV and then, Solution Ag-2 (silver nitrate: 0.1 g/ml) and Solution X-3 (sodium chloride: 0.0345 g/ml, KI: 3.8 mg/ml, $K_4[Ru(CN)_6]$: $2\times10^{-7}$ mol/ml) were added at a flow rate of 40 ml/min for 5 minutes. The resulting emulsion was left standing at 75° C. for 10 minutes.

Thereafter, the emulsion was desalted through precipitation and water washing at 40° C. Thereto, 100 g of gelatin was added and the emulsion was redispersed, thereby adjusting the pH and the pAg to 6.0 and 7.3, respectively. A part of the emulsion was sampled and an electron microphotograph image (TEM image) of the replica of grains was observed. As a result, it was found that 90% of the total projected area of all AgX grains were a tabular grain having {100} main plane and the tabular grains had an average grain size of 0.80 μm, an average grain thickness of 0.10 μm, and average aspect ratio of 7.8 and an average adjacent sides ratio of 1.2.

(Chemical Sensitization and Spectral Sensitization)

To Emulsion C, a gold sensitizer (bis(1,4,5-trimethyl-1, 2,4-triazolium-3-thiolate) Au(I) tetrafluoroborate), a sulfur sensitizer (sodium thiosulfate) and $6.0\times10^{-4}$ mol/mol-Ag of a spectral sensitizing dye shown in Table 4 to optimally perform the chemical sensitization and spectral sensitization at 60° C. Furthermore, $4.4\times10^{-4}$ mol/mol-Ag of 1-(5-methylureidophenyl)-5-mercaptotetrazole was added.

Coated Samples T201 and T202 were obtained in the same manner as Coated Sample T110 in Example 1 except for using Emulsion C as the green-sensitive emulsion. These samples were measured on the sensitivity, fogging and pressure fogging in the same manner as in Example 1. The results obtained are shown in Table 4.

The sensitivity was shown by a relative value assuming that the sensitivity of Sample T201 was 100. As seen from Table 4, even with use of {100} tabular grains, when a dye according to the present invention was used, the sensitivity was high and the fogging and the pressure fogging were low.

By virtue of the construction in claim 1 of the present invention, a light-sensitive material having high sensitivity and reduced in the fogging (relatively low also in the pressure fogging) can be obtained.

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive material comprising at least one silver halide emulsion layer, wherein the silver halide grain contained in said emulsion layer is silver chloroiodide or silver chloroiodobromide having a silver chloride content of 90 mol % or more and a silver iodide content of 0.01 to 1.0 mol %, at least one hexacyano complex is doped in an amount of at least $1\times10^{-7}$ mol % based on the total silver amount, and said emulsion layer contains a methine dye represented by the following formula (I):

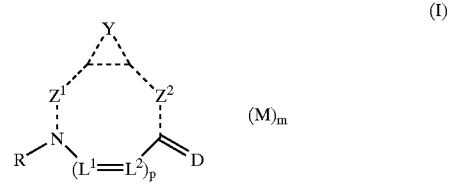

wherein Y represents an atomic group necessary for forming a heterocyclic ring or an atomic group necessary for forming a benzene ring condensed with a heterocyclic ring, which may further be condensed with another carbon ring or heterocyclic ring or may have a substituent, $Z^1$ and $Z^2$ each represents a single bond or an atomic group necessary for forming a nitrogen-containing heterocyclic ring which may further be condensed with another carbon ring or heterocyclic ring or may have a substituent, R represents an alkyl group, an aryl group or a heterocyclic group, D represents a group necessary for forming a methine dye, $L^1$ and $L^2$ each represents a methine group, p represents 0 or 1, M represents a counter ion, and m represents a number of 0 or more necessary for neutralizing the electric charge within the molecule.

2. The silver halide photographic light-sensitive material as claimed in claim 1, wherein in formula (I), Y represents an atomic group necessary for forming a pyrrole ring, a furan ring, a thiophene ring or a benzene ring condensed with a pyrrole ring, a furan ring or a thiophene ring, and the ring formed by Y may be condensed with another carbon ring or heterocyclic ring or may have a substituent.

TABLE 4

| Coated Sample | | 180-Second Processing | | | 70-Second Processing | | | |
|---|---|---|---|---|---|---|---|---|
| No. (Emulsion No.) | Sensitizing Dye | Blue Sensitivity | Fogging | Pressure Fogging | Blue Sensitivity | Fogging | Pressure Fogging | Remarks |
| T201 (C) | C | 100 | 0.04 | 0.163 | 110 | 0.06 | 0.199 | Comparison |
| T202 (C) | I-30 | 115 | 0.03 | 0.130 | 122 | 0.04 | 0.145 | Invention |

3. The silver halide photographic light-sensitive material as claimed in claim 1, wherein the formula (I) is selected from the following formula (II):

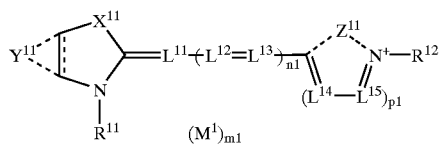

(II)

wherein $Y^{11}$ represents an atomic group necessary for forming a pyrrole ring, a furan ring or a thiophene ring, or an atomic group necessary for forming an indole ring, a benzofuran ring or a benzothiophene ring, which may further be condensed with another carbon ring or heterocyclic ring or may have a substituent, $X^{11}$ represents an oxygen atom, a sulfur atom, a selenium atom or $NR^{13}$, $R^{11}$, $R^{12}$ and $R^{13}$ each represents an alkyl group, an aryl group or a heterocyclic group, $Z^{11}$ represents an atomic group necessary for forming a nitrogen-containing heterocyclic ring which may further be condensed with another carbon ring or heterocyclic ring or may have a substituent, $L^{11}$, $L^{12}$, $L^{13}$, $L^{14}$ and $L^{15}$ each represents a methine group, p1 represents 0 or 1, n1 represents 0, 1, 2, 3 or 4, $M^1$ represents a counter ion and m1 represents a number of 0 or more necessary for neutralizing the electric charge within the molecule.

4. The silver halide photographic light-sensitive material as claimed in claim 1, wherein the formula (I) is selected from the following formula (III):

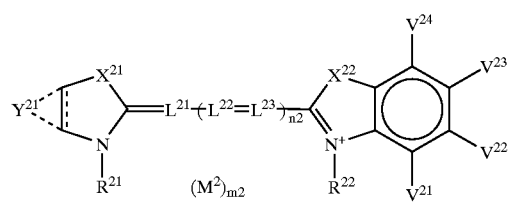

(III)

wherein $Y^{21}$ represents an atomic group necessary for forming a pyrrole ring, a furan ring or a thiophene ring, which may further be condensed with another carbon ring or heterocyclic ring or may have a substituent, $X^{21}$ and $X^{22}$ each represents an oxygen atom, a sulfur atom, a selenium atom or $NR^{23}$, $R^{21}$, $R^{22}$ and $R^{23}$ each represents an alkyl group, an aryl group or a heterocyclic group, $V^{21}$, $V^{22}$, $V^{23}$ and $V^{24}$ each represents a hydrogen atom or a substituent, provided that two adjacent substituents are not combined with each other to form a saturated or unsaturated condensed ring, $L^{21}$, $L^{22}$ and $L^{23}$ each represents a methine group, n2 represents 0, 1, 2, 3 or 4, $M^2$ represents a counter ion and m2 represents a number of 0 or more necessary for neutralizing the electric charge within the molecule.

5. The silver halide photographic light-sensitive material as claimed in claim 1, wherein the silver halide grain is doped with at least one Ir complex.

6. The silver halide light-sensitive material as claimed in claim 1, wherein silver halide grains occupying 50% or more of the entire grain volume have a high silver bromide localized phase having a silver bromide content 10 mol % or more higher than that of the adjacent phase and said high silver bromide localized phase contains at least one Ir complex.

7. A method for forming an image, comprising imagewise exposing and developing a silver halide photographic light-sensitive material comprising a support having thereon at least one silver halide emulsion layer, wherein said silver halide light-sensitive material is the light-sensitive material claimed in claim 1 and the total processing time of said light-sensitive material is 75 seconds or less.

8. The method for forming an image as claimed in claim 7, wherein digital scanning exposure is performed.

9. The silver halide photographic light-sensitive material as claimed in claim 1, wherein in formula (I), Y represents an atomic group necessary for forming a heterocyclic ring or an atomic group necessary for forming an indole ring or a benzofuran ring.

* * * * *